United States Patent
Ou et al.

(10) Patent No.: US 10,164,731 B2
(45) Date of Patent: Dec. 25, 2018

(54) METHOD FOR BASE STATION BACKHAUL, RELATED DEVICE AND SYSTEM FOR BASE STATION BACKHAUL

(71) Applicant: Huawei Technologies Co., Ltd., Shenzhen (CN)

(72) Inventors: Jian Ou, Shenzhen (CN); Ronghua Xie, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 167 days.

(21) Appl. No.: 15/055,324

(22) Filed: Feb. 26, 2016

(65) Prior Publication Data
US 2016/0182180 A1    Jun. 23, 2016

Related U.S. Application Data

(63) Continuation of application No. PCT/CN2014/085647, filed on Sep. 1, 2014.

(30) Foreign Application Priority Data

Aug. 30, 2013 (CN) .......................... 2013 1 0389014

(51) Int. Cl.
*H04J 4/00* (2006.01)
*H04J 14/02* (2006.01)
(Continued)

(52) U.S. Cl.
CPC .... *H04J 14/0298* (2013.01); *H04B 10/25753* (2013.01); *H04B 10/548* (2013.01);
(Continued)

(58) Field of Classification Search
CPC ..... G08B 21/02; G08B 25/00; H04W 88/022; H04W 88/185; H04L 15/26; H04L 5/0044;
(Continued)

(56) References Cited

U.S. PATENT DOCUMENTS 8,693,397 B2 * 4/2014 Ho .......................... H04W 24/02
 370/252
9,088,060 B2 7/2015 Robin et al.
(Continued)

FOREIGN PATENT DOCUMENTS

CN 101106766 A 1/2008
CN 101183900 A 5/2008
(Continued)

OTHER PUBLICATIONS

Pucci et al., "New Low Loss Inverted Microstrip Line using Gap Waveguide Technology for Slot Antenna Applications," IEEE Conference Publications, Proceedings of the 5$^{th}$ European Conference on Antennas and Propagation (EUCAP), pp. 979-982, Institute of Electrical and Electronics Engineers, New York, New York (Apr. 11-15, 2011).

*Primary Examiner* — Tesfaldet Bocure
(74) *Attorney, Agent, or Firm* — Leydig, Voit & Mayer, Ltd.

(57) ABSTRACT

Embodiments of the present disclosure disclose a method for base station backhaul, a related device and a system for base station backhaul. The method for base station backhaul includes: modulating data carried on at least two channels to corresponding subcarriers respectively, combining and modulating the subcarriers to a first OFDM signal, sending a first broadband OFDM signal to a remote radio unit, sending, by the remote radio unit, the first broadband OFDM signal to an antenna port after splitting and filtering the same; receiving a second broadband OFDM signal sent by the remote radio unit, demodulating subcarriers included in the second broadband OFDM signal, and sending data obtained by demodulating to corresponding channels respectively. By adopting the present disclosure, a utilization rate of a link channel may be improved, and high-capacity (Continued)

base station backhaul may be achieved under a low cost condition.

16 Claims, 14 Drawing Sheets

(51) Int. Cl.
   *H04L 27/26* (2006.01)
   *H04B 10/548* (2013.01)
   *H04B 10/2575* (2013.01)
   *H04L 5/00* (2006.01)

(52) U.S. Cl.
   CPC ........ *H04L 27/2628* (2013.01); *H04L 5/0007* (2013.01); *H04L 5/0044* (2013.01)

(58) Field of Classification Search
   CPC ............... H04L 27/2628; H04L 5/0007; H04J 14/0298; H04B 10/548; H04B 10/25753
   USPC .......................................... 370/203, 208, 210
   See application file for complete search history.

(56) References Cited

U.S. PATENT DOCUMENTS

| | | | | |
|---|---|---|---|---|
| 2009/0036150 A1* | 2/2009 | Liao | .................... | H04B 7/0671 455/501 |
| 2009/0297144 A1* | 12/2009 | Djordevic | .......... | H04B 10/2569 398/39 |
| 2010/0020730 A1 | 1/2010 | Man et al. | | |
| 2011/0092241 A1* | 4/2011 | Kawai | .................. | H04B 7/0404 455/509 |
| 2011/0140810 A1 | 6/2011 | Leiba et al. | | |
| 2013/0028107 A1* | 1/2013 | Ho | ........................ | H04W 24/02 370/252 |
| 2013/0083705 A1* | 4/2013 | Ma | ......................... | H04B 7/024 370/280 |
| 2013/0216229 A1* | 8/2013 | Cvijetic | ........... | H04B 10/25754 398/66 |
| 2014/0016586 A1* | 1/2014 | Khan | ................... | H04L 1/0003 370/329 |
| 2014/0198655 A1* | 7/2014 | Ishii | ..................... | H04W 76/023 370/235 |
| 2014/0362701 A1* | 12/2014 | Roh | .................. | H03M 13/2966 370/235 |

FOREIGN PATENT DOCUMENTS

| | | |
|---|---|---|
| CN | 101420254 A | 4/2009 |
| CN | 101753181 A | 6/2010 |
| CN | 102201856 A | 9/2011 |
| CN | 103248453 A | 8/2013 |
| WO | WO 2011069980 A1 | 6/2011 |
| WO | 2013009483 A2 | 1/2013 |

\* cited by examiner

METHOD FOR BASE STATION BACKHAUL, RELATED DEVICE AND SYSTEM FOR BASE STATION BACKHAUL

CROSS-REFERENCE TO RELATED APPLICATIONS

This application is a continuation of International Patent Application No. PCT/CN2014/085647, filed on Sep. 1, 2014, which claims priority to Chinese Patent Application No. 201310389014.2, filed on Aug. 30, 2013, both of which are hereby incorporated by reference in their entireties.

TECHNICAL FIELD

The present disclosure relates to the field of communications, and in particular, to a method for base station backhaul, a related device and a system for base station backhaul.

BACKGROUND

With continuous development of communication technologies, a distributed base station has become a development direction of a next generation base station because of its advantages of a low cost, great environment adaptability and engineering construction convenience. A core concept of a distributed base station structure is to separate a traditional macro base station base band unit (BBU) from a remote radio unit (RRU). The RRU is used for transceiving a radio frequency signal, and the BBU is used for modulating and demodulating user data.

At present, a common base station backhaul architecture of the distributed base station is that the BBU and the RRU are interconnected via a common public radio interface (CPRI). The RRU successively performs frequency conversion and analog-digital conversion on a received radio frequency signal and transmits a digital signal flow to the BBU through the CPRI with an optical fiber (may be a cable in a short-distance scene).

In the above-mentioned base station backhaul architecture, a base station system adopts a backhaul protocol (CPRI) irrespective of a modulation mode. In a case of rapid development of mobile communications, taking 8T8R of 5 frequency bands, three 20 MHz long terms evolution (LTE) carriers in each frequency band and three sectors for calculation, a CPRI interface transmission rate needs to reach 442.368 Gbps to meet demands, such that a cost of transmission between the RRU and the BBU is quite high, and thus the base station system cannot meet requirements of mass mobile data communications within a reasonable cost.

SUMMARY

Embodiments of the present disclosure provide a method for base station backhaul and a related device, which may satisfy high-capacity base station backhaul under a low cost condition.

A first aspect of the present application provides a method for base station backhaul, including:

modulating data carried on at least two channels to corresponding sending subcarriers respectively, combining and modulating the sending subcarriers to a first broadband orthogonal frequency division combining (OFDM) signal, performing digital-analog conversion on the first broadband OFDM signal to generate a first analog broadband OFDM signal, and sending the first analog broadband OFDM signal to a remote radio unit in a radio over fiber manner; and receiving a second analog broadband OFDM signal sent by the remote radio unit in the radio over fiber manner, performing analog-digital conversion on the second analog broadband OFDM signal to generate a second broadband OFDM signal, demodulating receiving subcarriers included in the second broadband OFDM signal, and sending data obtained by demodulating to channels corresponding to different receiving carriers respectively.

In the first possible implementation manner of the first aspect of the present application, the method for base station backhaul provided by the first aspect of the present application may further include:

before the modulating the data carried on the at least two channels to the corresponding sending subcarriers respectively, encoding the data carried on the at least two channels respectively; and after the sending the data obtained by the demodulating to the channels corresponding to the different receiving subcarriers respectively, decoding the data respectively.

In the second possible implementation manner of the first aspect of the present application, the method for base station backhaul provided by the first aspect of the present application may further include:

modulating data carried on a low-rate common public radio interface (CPRI) channel after encoding the same to a first CPRI carrier, converting the first CPRI carrier into a digital modulation mode to generate a third broadband OFDM signal, sending the third broadband OFDM signal to the remote radio unit, recovering, by the remote radio unit, the third broadband OFDM signal to the first CPRI carrier and sending, by the remote radio unit, the first CPRI carrier to a low-rate remote radio unit through a CPRI interface, and sending, by the low-rate remote radio unit, the first CPRI carrier to an antenna port of the low-rate remote radio unit after performing radio frequency conversion on the same; and receiving a fourth broadband OFDM signal sent by the remote radio unit, recovering the fourth broadband OFDM signal to a second CPRI carrier, and sending the second CPRI carrier to the low-rate CPRI channel after demodulating and decoding the same, where the remote radio unit receives the second CPRI carrier sent by the low-rate remote radio unit through the CPRI interface and converts the second CPRI carrier into the fourth broadband OFDM signal.

In the third possible implementation manner of the first aspect of the present application, the method for base station backhaul provided by the first aspect of the present application may further include:

modulating data carried on a non long terms evolution LTE technology channel to a first non LTE technology carrier after encoding the same, sending the first non LTE technology carrier to the remote radio unit after performing up-conversion on the same, and sending, by the remote radio unit, the first non LTE technology carrier to an antenna port; and receiving a second non LTE technology carrier sent by the remote radio unit, and sending the second non LTE technology carrier to the non long terms evolution LTE technology channel after demodulating and decoding the same.

A second aspect of the present application provides a method for base station backhaul, including:

receiving a first analog broadband orthogonal frequency division combining (OFDM) signal sent by a base band unit in a radio over fiber manner, performing splitting processing on the first analog broadband OFDM signal to generate at least two first analog broadband OFDM sub-signals, and sending the at least two first analog broadband OFDM sub-signals to antenna ports corresponding to different first analog broadband OFDM sub-signals after performing filtering and frequency conversion on the at least two first analog broadband OFDM sub-signals respectively; and receiving radio frequency signals through the antenna ports, performing frequency conversion and filtering on the radio frequency signals to obtain combined subcarriers corresponding to different antenna ports, performing combining processing on the combined subcarriers to generate a second analog broadband OFDM signal, and sending the second analog broadband OFDM signal to the base band unit in the radio over fiber manner.

In the first possible implementation manner of the second aspect of the present application, sending a first analog broadband OFDM sub-signal to a corresponding antenna port after performing filtering and frequency conversion on the first analog broadband OFDM sub-signal, includes:

performing splitting processing on the first analog broadband OFDM sub-signal to generate at least two second analog broadband OFDM sub-signals;

performing frequency shift conversion on the second analog broadband OFDM sub-signals to generate first mixing signals;

performing band-pass filtering on the first mixing signals to generate sending subcarriers;

up converting a frequency of the sending subcarriers to a transmitting frequency; and performing combining processing on the sending subcarriers after up-conversion, and sending the sending subcarriers to an antenna port corresponding to the sending sub carriers.

In combination with the first possible implementation manner of the second aspect of the present application, in the second possible implementation manner, performing frequency conversion and filtering on a radio frequency signal to obtain a corresponding combined subcarrier, includes:

performing splitting processing on the radio frequency signal to generate at least two radio frequency sub-signals;

performing down-conversion on the radio frequency sub-signals;

performing band-pass filtering on the radio frequency sub-signals after the down-conversion to generate receiving subcarriers;

performing frequency shift conversion on the receiving subcarriers; and performing combining processing on the receiving subcarriers after the frequency shift conversion to generate the combined subcarrier.

In combination with the second possible implementation manner of the second aspect, in the third possible implementation manner, the method for base station backhaul provided by the second aspect of the present application may further include:

receiving a third broadband OFDM signal sent by the base band unit, recovering the third broadband OFDM signal to a first common public radio interface (CPRI) carrier and sending the first CPRI carrier to a low-rate remote radio unit through a CPRI interface, and sending, by the low-rate remote radio unit, the first CPRI carrier to an antenna port of the low-rate remote radio unit after performing radio frequency conversion on the same, where the third broadband OFDM signal is sent by the base band unit after encoding and modulating data carried on a low-rate CPRI channel to obtain the first CPRI carrier, and converting the first CPRI carrier into a digital modulation manner to generate the third broadband OFDM signal; and receiving a second CPRI carrier sent by the low-rate remote radio unit through the CPRI interface, converting the second CPRI carrier into a fourth broadband OFDM signal, sending the fourth broadband OFDM signal to the base band unit, recovering, by the base band unit, the fourth broadband OFDM signal to the second CPRI carrier, and sending, by the base band unit, the second CPRI carrier to the low-rate CPRI channel after demodulating and decoding the same.

In combination with the second possible implementation manner of the second aspect, in the fourth possible implementation manner, the method for base station backhaul provided by the second aspect of the present application may further include:

receiving a first non long terms evolution LTE technology carrier sent by the base band unit, and sending the first non LTE technology carrier to an antenna port, where the first non LTE technology carrier is sent by the base band unit after encoding and modulating data carried on a non LTE technology channel to the first non LTE technology carrier and performing up-conversion on the first non LTE technology carrier; and receiving a second non LTE technology carrier sent by an antenna, and sending the second non LTE technology carrier to the base band unit.

A third aspect of the present application provides a base band unit device, including:

a broadband orthogonal frequency division combining (OFDM) modulation and demodulation module, configured to modulate data carried on at least two channels to corresponding sending subcarriers respectively, and combine and modulate the sending subcarriers to a first broadband OFDM signal;

a digital-analog conversion module, configured to perform digital-analog conversion on the first broadband OFDM signal generated by the broadband OFDM modulation and demodulation module to generate a first analog broadband OFDM signal;

a sending module, configured to send the first analog broadband OFDM signal generated by the digital-analog conversion module to a remote radio unit in a radio over fiber manner;

a receiving module, configured to receive a second broadband OFDM signal sent by the remote radio unit in the radio over fiber manner; and an analog-digital conversion module, configured to perform analog-digital conversion on the second analog broadband OFDM signal received by the receiving module to generate a second broadband OFDM signal; and the broadband OFDM modulation and demodulation module is configured to demodulate receiving subcarriers included in the second broadband OFDM signal received by the receiving module, and send data obtained by demodulating to channels corresponding to different receiving subcarriers respectively.

In the first possible implementation manner of the third aspect of the present application, the base band unit device provided by the third aspect of the present application further includes at least two channel encoding and decoding modules, where the at least two channel encoding and decoding modules are respectively configured to encode data carried on channels corresponding to the channel encoding and decoding modules and send the encoded data to the broadband OFDM modulation and demodulation module; and the at least two channel encoding and decoding modules are respectively configured to receive the data obtained by demodulating and sent by the broadband OFDM modulation and demodulation module and decode the data obtained by demodulating.

In the second possible implementation manner of the third aspect of the present application, the base band unit device provided by the third aspect of the present application may further include a low-rate common public radio interface (CPRI) channel processing module, where:

the CPRI channel processing module is configured to modulate data carried on a low-rate common public radio interface (CPRI) channel after encoding the same to a first CPRI carrier, and convert the first CPRI carrier into a digital modulation mode to generate a third broadband OFDM signal, the sending module sends the third broadband OFDM signal to the remote radio unit, the remote radio unit recovers the third broadband OFDM signal to the first CPRI carrier and sends the first CPRI carrier to a low-rate remote radio unit through a CPRI interface, and the low-rate remote radio unit sends the first CPRI carrier to an antenna port of the low-rate remote radio unit after performing radio frequency conversion on the same; and the CPRI channel processing module is configured to recover a fourth broadband OFDM signal sent by the remote radio unit and received by the receiving module to a second CPRI carrier, and send the second CPRI carrier to the low-rate CPRI channel after demodulating and decoding the same, where the remote radio unit receives the second CPRI carrier sent by the low-rate remote radio unit through the CPRI interface and converts the second CPRI carrier into the fourth broadband OFDM signal.

In the third possible implementation manner of the third aspect of the present application, the base band unit device provided by the third aspect of the present application may further include a non long terms evolution LTE technology channel processing module and a digital up-conversion and down-conversion module, where:

the non LTE technology channel processing module is configured to modulate data carried on a non LTE technology channel to a first non LTE technology carrier after encoding the same;

the digital up-conversion and down-conversion module is configured to send the first non LTE technology carrier to the remote radio unit through the sending module after performing up-conversion on the same, and the remote radio unit sends the first non LTE technology carrier to an antenna port;

the digital up-conversion and down-conversion module is configured to perform down-conversion on a second non LTE technology carrier sent by the remote radio unit and received by the receiving module; and the non LTE technology channel processing module is configured to send the second non LTE technology carrier, performed with down-conversion by the digital up-conversion and down-conversion module, to the non long terms evolution LTE technology channel after demodulating and decoding the same.

A fourth aspect of the present application provides a remote radio unit device, including:

a receiving module, configured to receive a first analog broadband orthogonal frequency division combining (OFDM) signal sent by a base band unit in a radio over fiber manner;

a splitting module, configured to perform splitting processing on the first analog broadband OFDM signal received by the receiving module to generate at least two first analog broadband OFDM sub-signals;

at least two radio frequency transceiving modules, configured to send the at least two first analog broadband OFDM sub-signals split by the splitting module to antenna ports corresponding to different first analog broadband OFDM sub-signals after performing filtering and frequency conversion on the at least two first analog broadband OFDM sub-signals respectively; and the at least two radio frequency transceiving modules are configured to receive radio frequency signals through the antenna ports respectively, and perform frequency conversion and filtering on the radio frequency signals to obtain combined subcarriers corresponding to different antenna ports;

a combining module, configured to perform combining processing on the combined subcarriers generated by the radio frequency transceiving modules to generate a second analog broadband OFDM signal; and a sending module, configured to send the second analog broadband OFDM signal generated by the combining module to the base band unit in the radio over fiber manner.

In the first possible implementation manner of the fourth aspect of the present application, the radio frequency transceiving module includes:

a first splitting unit, configured to perform splitting processing on a first analog broadband OFDM sub-signal to generate at least two second analog broadband OFDM sub-signals;

at least two first frequency conversion units, respectively configured to perform frequency shift conversion on the at least two second analog broadband OFDM sub-signals generated by the first splitting unit to generate first mixing signals;

at least two band-pass filtering units, respectively configured to perform band-pass filtering on the first mixing signals generated by the at least two first frequency conversion units to generate sending subcarriers;

at least two second frequency conversion units, respectively configured to up convert a frequency of the sending subcarriers generated by the at least two band-pass filtering units to a transmitting frequency; and a first combining unit, configured to perform combining processing on the sending subcarriers after up-conversion of the at least two second frequency conversion units, and respectively send the sending subcarriers to an antenna port corresponding to the sending subcarriers.

In combination with the first possible implementation manner of the fourth aspect, in the second possible implementation manner, the radio frequency transceiving module may further include:

a second splitting unit, configured to perform splitting processing on a radio frequency signal to generate at least two radio frequency sub-signals, and respectively send the at least two radio frequency sub-signals to corresponding second frequency conversion units, the second frequency conversion units send the radio frequency sub-signals to the band-pass filtering units corresponding to the radio frequency sub-signals after performing down-conversion on the same, the band-pass filtering units perform band-pass filtering on the radio frequency sub-signals after the down-conversion to generate receiving subcarriers and send the receiving subcarriers to the first frequency conversion units corresponding to the receiving subcarriers, and the first frequency conversion units perform frequency shift conversion on the receiving subcarriers; and a second combining unit, configured to perform combining processing on the receiving subcarriers after the frequency shift conversion of the at least two first frequency conversion units to generate a combined subcarrier.

In combination with the second possible implementation manner of the second aspect, in the third possible implementation manner, the remote radio unit device provided by the fourth aspect of the present application may further include:

a low-rate common public radio interface (CPRI) modulation and demodulation module, configured to recover a third broadband OFDM signal received by the receiving module to a first common public radio interface (CPRI) carrier and send the first common public radio interface (CPRI) carrier to a low-rate remote radio unit through a CPRI interface, and the low-rate remote radio unit sends the first CPRI carrier to an antenna port of the low-rate remote radio unit after performing radio frequency conversion on the same, where the third broadband OFDM signal is sent by the base band unit after encoding and modulating data carried on a low-rate CPRI channel to obtain the first CPRI carrier, and converting the first CPRI carrier into a digital modulation manner to generate the third broadband OFDM signal; and the CPRI modulation and demodulation module is configured to receive a second CPRI carrier sent by the low-rate remote radio unit through the CPRI interface, convert the second CPRI carrier into a fourth broadband OFDM signal, and send the fourth broadband OFDM signal to the base band unit, and the base band unit recovers the fourth broadband OFDM signal to the second CPRI carrier, and sends the second CPRI carrier to the low-rate CPRI channel after demodulating and decoding the same.

In combination with the second possible implementation manner of the fourth aspect, in the third possible implementation manner, the remote radio unit device provided by the fourth aspect of the present application may further include:

a non long terms evolution LTE technology radio frequency transceiving unit, configured to receive a first non LTE technology carrier sent by the base band unit, and send the first non LTE technology carrier to an antenna port, where the first non LTE technology carrier is sent by the base band unit after encoding and modulating data carried on a non LTE technology channel to the first non LTE technology carrier and performing up-conversion on the first non LTE technology carrier; and the non LTE technology radio frequency transceiving unit is configured to receive a second non LTE technology carrier sent by an antenna, and send the second non LTE technology carrier to the base band unit.

A fifth aspect of the present application provides a system for base station backhaul, including the base band unit device in the third aspect or any possible implementation manner of the third aspect of the present application, and the remote radio unit device in the fourth aspect or any possible implementation manner of the fourth aspect of the present application.

The method for base station backhaul provided by the present disclosure is applied to a distributed base station system, on a base station backhaul downlink in the distributed base station system, BBU combines and modulates a plurality of orthogonal LTE carriers to a broadband orthogonal frequency division combining (OFDM) signal, converts the broadband OFDM signal into an analog broadband OFDM signal, and sends the analog broadband OFDM signal to RRU in a radio over fiber (ROF) manner, and the RRU converts the analog broadband OFDM signal into a radio frequency signal and transmits the radio frequency signal through an antenna; on a base station backhaul uplink, the RRU converts a radio frequency signal received through the antenna into an analog broadband OFDM signal and sends the analog broadband OFDM signal to the BBU through ROF. Base station backhaul between the BBU and the RRU is transmitted by an OFDM signal, no frequency interval needs to be reserved between carriers, thereby a utilization rate of an optical transmission channel is improved, and the present disclosure may achieve high-capacity base station backhaul under a low cost condition.

BRIEF DESCRIPTION OF DRAWINGS

To illustrate technical solutions in embodiments of the present disclosure or in the prior art more clearly, a brief introduction on the accompanying drawings which are needed in the description of the embodiments or the prior art is given below. Apparently, the accompanying drawings in the description below are merely some of the embodiments of the present disclosure, based on which other drawings may be obtained by those of ordinary skill in the art without any creative effort.

DESCRIPTION OF EMBODIMENTS

A clear and complete description of technical solutions in embodiments of the present disclosure will be given below, in combination with the accompanying drawings in the embodiments of the present disclosure. Apparently, the embodiments described below are merely a part, but not all, of the embodiments of the present disclosure. All of the other embodiments, obtained by those of ordinary skill in the art based on the embodiments of the present disclosure without any creative effort, fall into the protection scope of the present disclosure.

Figure 1:
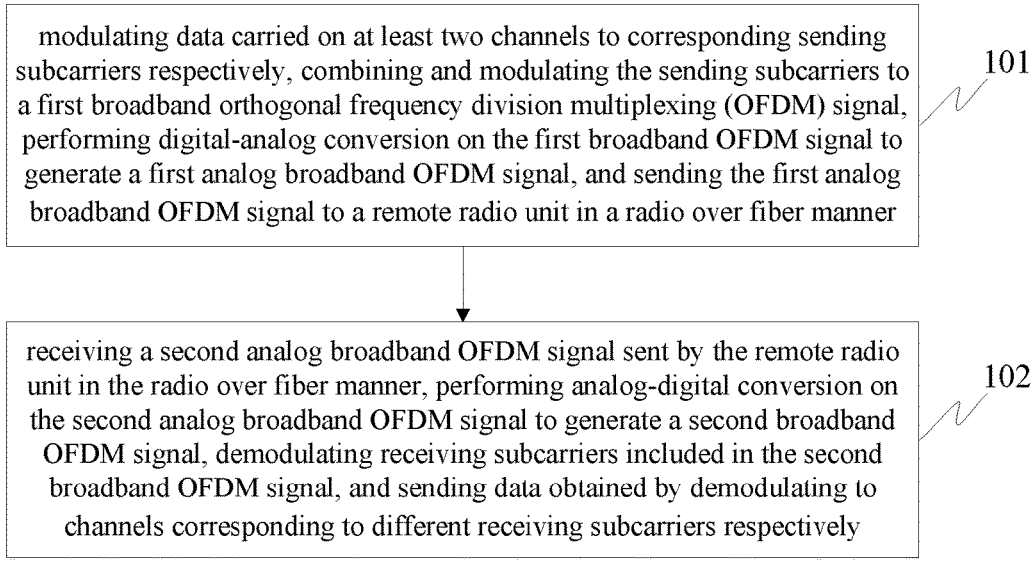
FIG. 1 is a flowchart of a method for base station backhaul provided by an embodiment of the present disclosure.

Please see FIG. 1. FIG. 1 is a flowchart of a method for base station backhaul provided by an embodiment of the present disclosure. The embodiment describes technical solutions of the present disclosure from a base band unit side, and an executive body of the embodiment may be a base band unit. As shown in FIG. 1, the embodiment includes:

101. modulating data carried on at least two channels to corresponding sending subcarriers respectively, combining and modulating the sending subcarriers to a first broadband orthogonal frequency division combining (OFDM) signal, performing digital-analog conversion on the first broadband OFDM signal to generate a first analog broadband OFDM signal, and sending the first analog broadband OFDM signal to a remote radio unit in a radio over fiber manner; and 102. receiving a second analog broadband OFDM signal sent by the remote radio unit in the radio over fiber manner, performing analog-digital conversion on the second analog broadband OFDM signal to generate a second broadband OFDM signal, demodulating receiving subcarriers included in the second broadband OFDM signal, and sending data obtained by demodulating to channels corresponding to different receiving sub carriers respectively.

In order to prevent reduced transmission reliability caused by signal attenuation in a transmission process, the embodiment may amplify the first analog broadband OFDM signal before sending the first analog broadband OFDM signal to the remote radio unit in the radio over fiber manner, and amplify the second analog broadband OFDM signal after receiving the second analog broadband OFDM signal.

Optionally, the method for base station backhaul provided by the embodiment may further include: before the modulating the data carried on the at least two channels to the corresponding sending subcarriers respectively, encoding the data carried on the at least two channels respectively; and after the sending the data obtained by the demodulating to the channels corresponding to the different receiving subcarriers respectively, decoding the data respectively.

Figure 2:
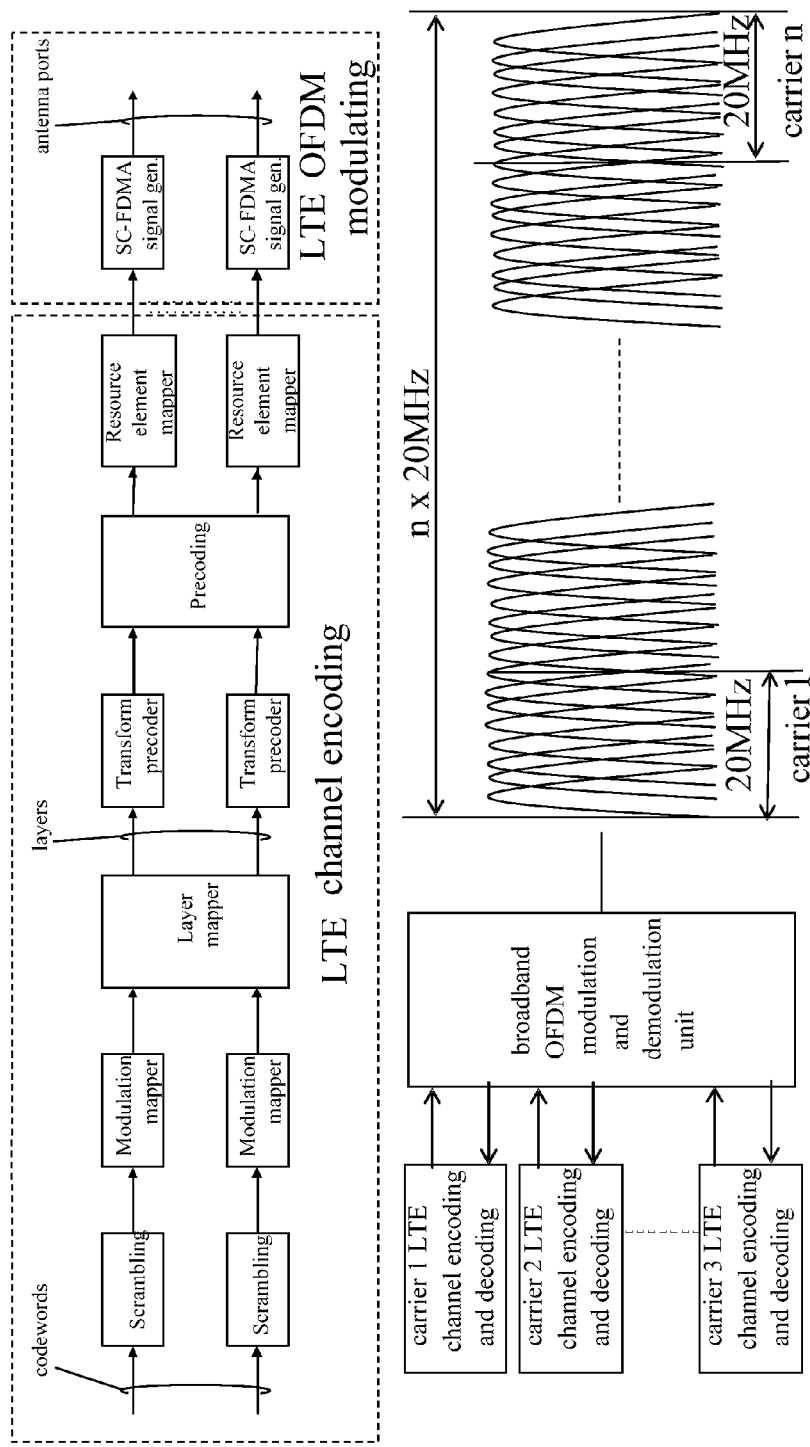
FIG. 2 is a schematic diagram of combining and modulating a broadband OFDM signal in the embodiment of FIG. 1 of the present disclosure.

In the embodiment, BBU separates LTE channel decoding from OFDM modulation and demodulation, a plurality of LTE carriers share a broadband OFDM modulation and demodulation unit, so as to combine and modulate a plurality of orthogonal LTE carriers to a broadband OFDM signal. The combining and modulating in the present disclosure refer to, similar to performing OFDM modulation on original data of the plurality of LTE carriers through an inverse fast Fourier transform (IFFT) converter to form a broadband OFDM carrier, instead of performing modulation adopting respective IFFT OFDM modulation units to generate independent OFDM narrowband carriers. A schematic diagram of combining and modulating the broadband OFDM signal is shown in FIG. 2.

In the method for base station backhaul provided by the embodiment, a downlink includes: a broadband OFDM signal is converted into an analog signal by digital-analog conversion and is transmitted by a linear optical module link to the remote radio unit at a remote end, and the broadband OFDM signal is sent to an antenna port to be transmitted by an antenna after amplification, splitting, frequency shift conversion, narrow band filtering and radio frequency up-conversion in the remote radio unit.

An uplink includes: a radio frequency signal is transmitted by a linear optical link to BBU after down-conversion, frequency shift conversion, combining and amplification, and is converted into a digital signal after analog data conversion. The BBU respectively sends each subcarrier to a corresponding channel decoding unit after demodulating the same.

Optionally, the method for base station backhaul provided by the embodiment may further include:

modulating data carried on a low-rate common public radio interface (CPRI) channel after encoding the same to a first CPRI carrier, converting the first CPRI carrier into a digital modulation mode to generate a third broadband OFDM signal, sending the third broadband OFDM signal to the remote radio unit, recovering, by the remote radio unit, the third broadband OFDM signal to the first CPRI carrier and sending, by the remote radio unit, the first CPRI carrier to a low-rate remote radio unit through a CPRI interface, and sending, by the low-rate remote radio unit, the first CPRI carrier to an antenna port of the low-rate remote radio unit after performing radio frequency conversion on the same; and receiving a fourth broadband OFDM signal sent by the remote radio unit, recovering the fourth broadband OFDM signal to a second CPRI carrier, and sending the second CPRI carrier to the low-rate CPRI channel after demodulating and decoding the same, where the remote radio unit receives the second CPRI carrier sent by the low-rate remote radio unit through the CPRI interface and converts the second CPRI carrier into the fourth broadband OFDM signal.

The embodiment may be compatible with an existing tower RRU, the BBU and the RRU transmit CPRI digital signals through several sub-channels in the broadband OFDM signal, and the BBU and a new RRU achieve an existing low-rate CPRI channel using a certain bandwidth. Meanwhile, an RRU module may also be controlled by a part of digital channels of a modulation and demodulation module.

Optionally, the method for base station backhaul provided by the embodiment may further include:

modulating data carried on a non long terms evolution LTE technology channel to a first non LTE technology carrier after encoding the same, sending the first non LTE technology carrier to the remote radio unit after performing up-conversion on the same, and sending, by the remote radio unit, the first non LTE technology carrier to an antenna port; and receiving a second non LTE technology carrier sent by the remote radio unit, and sending the second non LTE technology carrier to the non long terms evolution LTE technology channel after demodulating and decoding the same.

The non LTE technology may be a universal mobile telecommunications system (UMTS) technology or a global system for mobile communications (GSM) technology. A non LTE technology carrier analog signal is transmitted between the BBU and the RRU by other frequency points different from the broadband OFDM signal.

In the method for base station backhaul provided by the embodiment, an analog broadband OFDM signal is transmitted between the RRU and the BBU in the radio over fiber manner, the BBU modulates a plurality of LTE carriers to a broadband OFDM signal in a combining and modulating manner, and no frequency interval needs to be reserved between the carriers, thereby a utilization rate of an optical transmission channel is improved, so that the embodiment may achieve high-capacity base station backhaul under a low cost condition. In addition, the method for base station backhaul provided by the embodiment may also transmit a signal of other technologies in a traditional frequency shift manner using a frequency point with a certain frequency interval to achieve a multimode RRU. Since the signal of the other technologies is narrow in a bandwidth and low in a rate, the utilization rate of the optical channel is not greatly influenced.

In the embodiment, the BBU combines and modulates a plurality of orthogonal LTE carriers to a broadband OFDM signal, base station backhaul between the BBU and the RRU is transmitted by the broadband OFDM signal, and no frequency interval needs to be reserved between the carriers, thereby a utilization rate of an optical communication link channel is improved. For example, only a linear optical module with a 3 GHz bandwidth is needed for transmitting 150 20 MHz LTE carrier signals, corresponding to that 19 10 Gbps optical modules are needed in a traditional CPRI solution, so the embodiment may greatly reduce a cost. Moreover, the embodiment may be compatible with an existing RRU CPRI base station backhaul solution and may achieve a multimode and multi-technology RRU, thereby having a universality.

Figure 3:
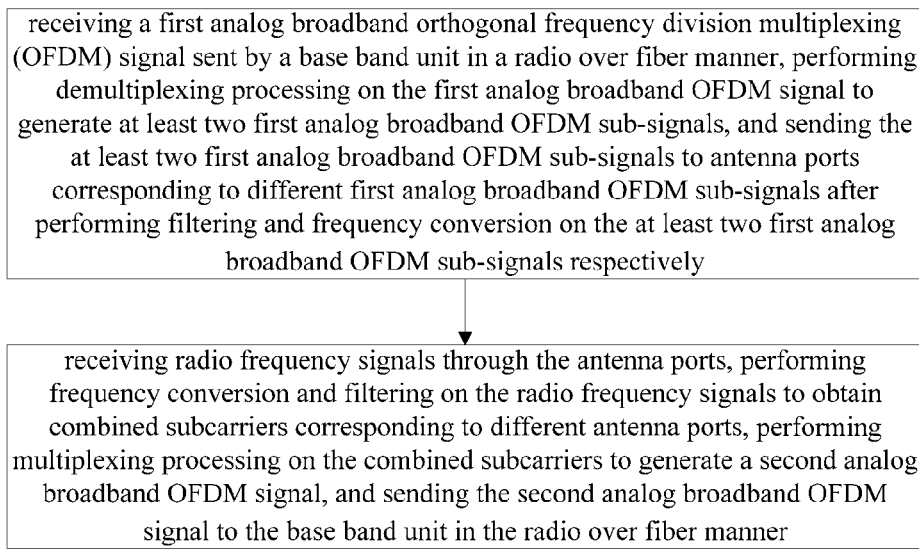
FIG. 3 is a flowchart of a method for base station backhaul provided by an embodiment of the present disclosure.

Please see FIG. 3. FIG. 3 is a flowchart of a method for base station backhaul provided by an embodiment of the present disclosure. The embodiment describes technical solutions of the present disclosure from a remote radio unit side, and an executive body of the embodiment may be a remote radio unit. As shown in FIG. 3, the method for base station backhaul provided by the embodiment includes:

201. receiving a first analog broadband orthogonal frequency division combining (OFDM) signal sent by a base band unit in a radio over fiber manner, performing splitting processing on the first analog broadband OFDM signal to generate at least two first analog broadband OFDM sub-signals, and sending the at least two first analog broadband OFDM sub-signals to antenna ports corresponding to different first analog broadband OFDM sub-signals after performing filtering and frequency conversion on the at least two first analog broadband OFDM sub-signals respectively; and 202. receiving radio frequency signals through the antenna ports, performing frequency conversion and filtering on the radio frequency signals to obtain combined subcarriers corresponding to different antenna ports, performing combining processing on the combined subcarriers to generate a second analog broadband OFDM signal, and sending the second analog broadband OFDM signal to the base band unit in the radio over fiber manner.

In order to prevent reduced transmission reliability caused by signal attenuation in a transmission process, the embodiment may amplify the first analog broadband OFDM signal after receiving the first analog broadband OFDM signal sent by the base band unit in the radio over fiber manner, and split the amplified first analog broadband OFDM signal; and amplify the second analog broadband OFDM signal before sending the second analog broadband OFDM signal to the base band unit in the radio over fiber manner.

Optionally, a specific step of sending a first analog broadband OFDM sub-signal to a corresponding antenna port after performing filtering and frequency conversion on the first analog broadband OFDM sub-signal may include:

performing splitting processing on the first analog broadband OFDM sub-signal to generate at least two second analog broadband OFDM sub-signals;

performing frequency shift conversion on the second analog broadband OFDM sub-signals to generate first mixing signals;

performing band-pass filtering on the first mixing signals to generate sending subcarriers;

up converting a frequency of the sending subcarriers to a transmitting frequency; and performing combining processing on the sending subcarriers after up-conversion, and sending the sending subcarriers to an antenna port corresponding to the sending sub carriers.

Optionally, performing frequency conversion and filtering on a radio frequency signal to obtain a corresponding combined subcarrier, includes:

performing splitting processing on the radio frequency signal to generate at least two radio frequency sub-signals;

performing down-conversion on the radio frequency sub-signals;

performing band-pass filtering on the radio frequency sub-signals after the down-conversion to generate receiving subcarriers;

performing frequency shift conversion on the receiving subcarriers; and performing combining processing on the receiving subcarriers after the frequency shift conversion to generate the combined subcarrier.

Optionally, the method for base station backhaul provided by the embodiment may further include:

receiving a third broadband OFDM signal sent by the base band unit, recovering the third broadband OFDM signal to a first common public radio interface (CPRI) carrier and sending the first CPRI carrier to a low-rate remote radio unit through a CPRI interface, and sending, by the low-rate remote radio unit, the first CPRI carrier to an antenna port of the low-rate remote radio unit after performing radio frequency conversion on the same, where the third broadband OFDM signal is sent by the base band unit after encoding and modulating data carried on a low-rate CPRI channel to obtain the first CPRI carrier, and converting the first CPRI carrier into a digital modulation manner to generate the third broadband OFDM signal; and receiving a second CPRI carrier sent by the low-rate remote radio unit through the CPRI interface, converting the second CPRI carrier into a fourth broadband OFDM signal, sending the fourth broadband OFDM signal to the base band unit, recovering, by the base band unit, the fourth broadband OFDM signal to the second CPRI carrier, and sending, by the base band unit, the second CPRI carrier to the low-rate CPRI channel after demodulating and decoding the same.

The low-rate remote radio unit is an existing RRU, and the embodiment may be compatible with an existing tower RRU, so that the BBU and the RRU in the present disclosure achieve an existing low-rate CPRI channel using a certain bandwidth. Meanwhile, an RRU module may also be controlled by a part of digital channels of a modulation and demodulation module.

Optionally, the method for base station backhaul provided by the embodiment may further include:

receiving a first non long terms evolution LTE technology carrier sent by the base band unit, and sending the first non LTE technology carrier to an antenna port, where the first non LTE technology carrier is sent by the base band unit, after encoding and modulating data carried on a non LTE technology channel to the first non LTE technology carrier and performing up-conversion on the first non LTE technology carrier; and receiving a second non LTE technology carrier sent by an antenna, and sending the second non LTE technology carrier to the base band unit.

The non LTE technology may be a UMTS technology or a GSM technology.

The method for base station backhaul provided by the embodiment, besides using a broadband OFDM combined and modulated carrier to send an LTE signal, may also transmit a signal of other technologies in a traditional frequency shift manner using a frequency point with a certain frequency interval to achieve a multimode RRU. Since the signal of the other technologies is narrow in a bandwidth and low in a rate, a utilization rate of an optical channel is not greatly influenced.

In the method for base station backhaul provided by the embodiment, an analog broadband OFDM signal is transmitted between the RRU and the BBU in the radio over fiber manner, the BBU modulates a plurality of LTE carriers to a broadband OFDM signal in a combining and modulating manner, and no frequency interval needs to be reserved between the carriers, thereby a utilization rate of an optical transmission channel is improved, so that the embodiment may achieve high-capacity base station backhaul under a low cost condition. In addition, the method for base station backhaul provided by the embodiment may also transmit the signal of the other technologies in the traditional frequency shift manner using the frequency point with the certain frequency interval to achieve the multimode RRU. Since the signal of the other technologies is narrow in the bandwidth and low in the rate, the utilization rate of the optical channel is not greatly influenced.

In the embodiment, base station backhaul between the RRU and the BBU is transmitted by the broadband OFDM signal, and no frequency interval needs to be reserved between the carriers, thereby a utilization rate of a link channel is high, and moreover, the embodiment may be compatible with an existing RRU CPRI base station backhaul solution and may achieve a multimode and multi-technology RRU, thereby having a universality.

Figure 4:
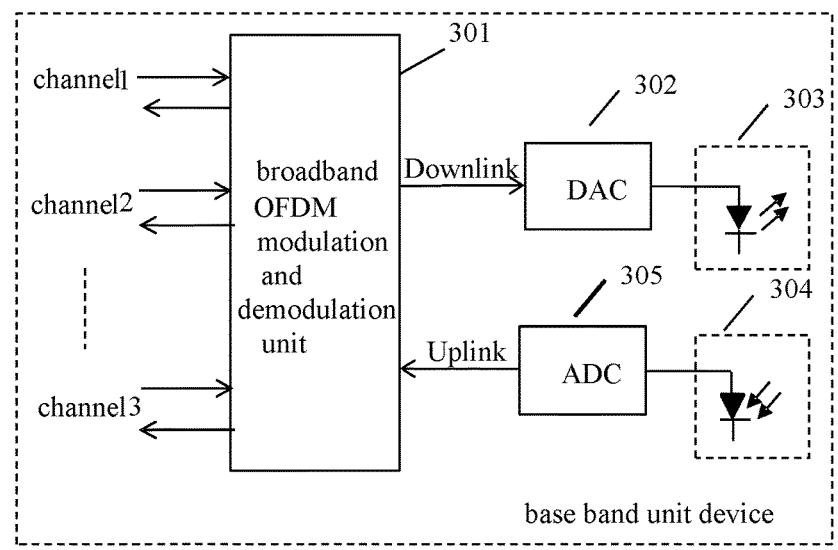
FIG. 4 is a structure diagram of a base band unit device provided by an embodiment of the present disclosure.

Please see FIG. 4. FIG. 4 is a structure diagram of a base band unit device provided by an embodiment of the present disclosure. As shown in FIG. 4, the base band unit device provided by the embodiment includes:

a broadband OFDM modulation and demodulation module 301, configured to modulate data carried on at least two channels to corresponding sending subcarriers respectively, and combine and modulate the sending subcarriers to a first broadband OFDM signal;

a digital-analog conversion module 302, configured to perform digital-analog conversion on the first broadband OFDM signal generated by the broadband OFDM modulation and demodulation module 301 to generate a first analog broadband OFDM signal;

a sending module 303, configured to send the first analog broadband OFDM signal generated by the digital-analog conversion module 302 to a remote radio unit in a radio over fiber manner;

a receiving module 304, configured to receive a second analog broadband OFDM signal sent by the remote radio unit in the radio over fiber manner; and an analog-digital conversion module 305, configured to perform analog-digital conversion on the second analog broadband OFDM signal received by the receiving module to generate a second broadband OFDM signal; and the broadband OFDM modulation and demodulation module 301, configured to demodulate receiving subcarriers included in the second broadband OFDM signal received by the receiving module 305, and send data obtained by demodulating to channels corresponding to different receiving subcarriers respectively.

Figure 5:
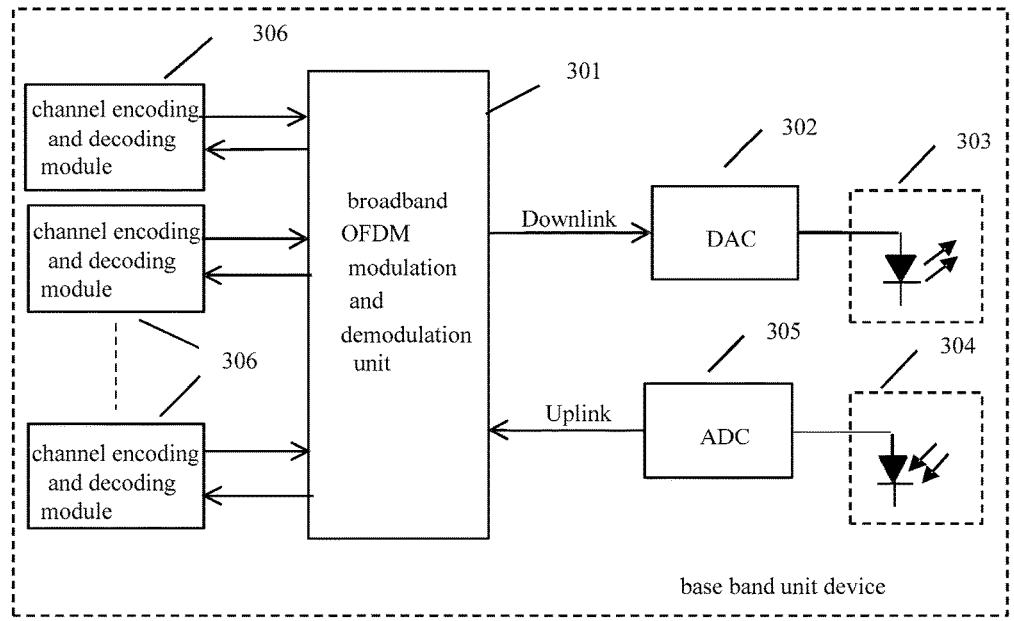
FIG. 5 is a structure diagram of another base band unit device provided by an embodiment of the present disclosure.

Optionally, as shown in FIG. 5, the base band unit device provided by the embodiment may further include at least two channel encoding and decoding modules 306, the at least two channel encoding and decoding modules 306 are respectively configured to encode data carried on channels corresponding to the channel encoding and decoding modules and send the encoded data to the broadband OFDM modulation and demodulation module 301; and the at least two channel encoding and decoding modules 306 are respectively configured to receive the data obtained by demodulating and sent by the broadband OFDM modulation and demodulation module 301 and decode the data obtained by demodulating.

Figure 6:
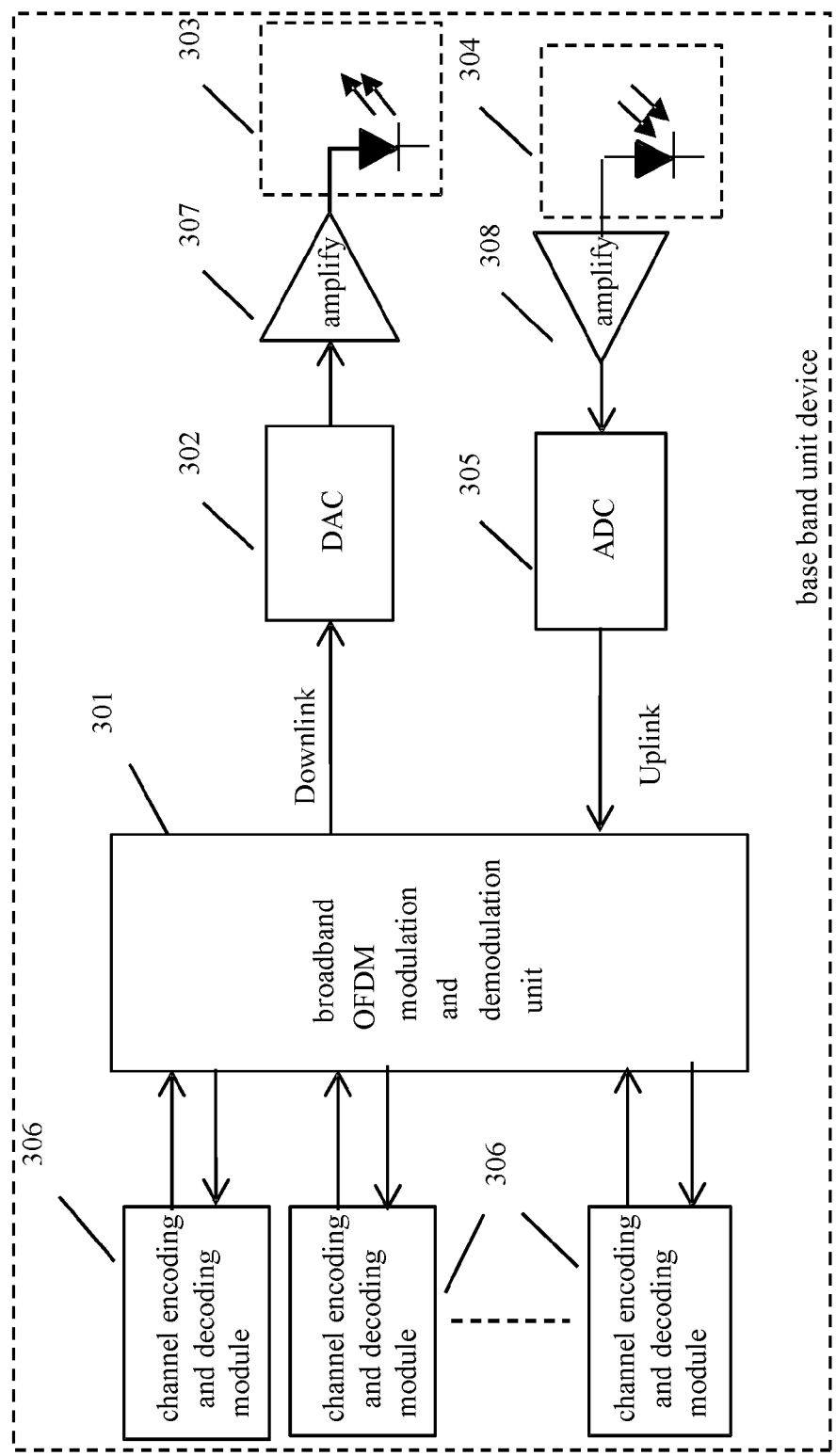
FIG. 6 is a structure diagram of another base band unit device provided by an embodiment of the present disclosure.

In order to prevent reduced transmission reliability caused by signal attenuation in a transmission process, as shown in FIG. 6, the base band unit device provided by the embodiment may further include a first amplification module 307 and a second amplification module 308, where the first amplification module 307 amplifies the first analog broadband OFDM signal before the sending module 303 sends the first analog broadband OFDM signal to the remote radio unit in the radio over fiber manner; and the second amplification module 308 amplifies the second analog broadband OFDM signal after the receiving module 308 receives the second analog broadband OFDM signal.

The above-mentioned digital-analog conversion unit may be achieved by a digital-analog converter; the analog-digital conversion unit may be achieved by an analog-digital converter; the first amplification module and the second amplification module may be achieved by an integrated operational amplifier; and the sending unit and the receiving unit may be a linear optical module.

Figure 7:
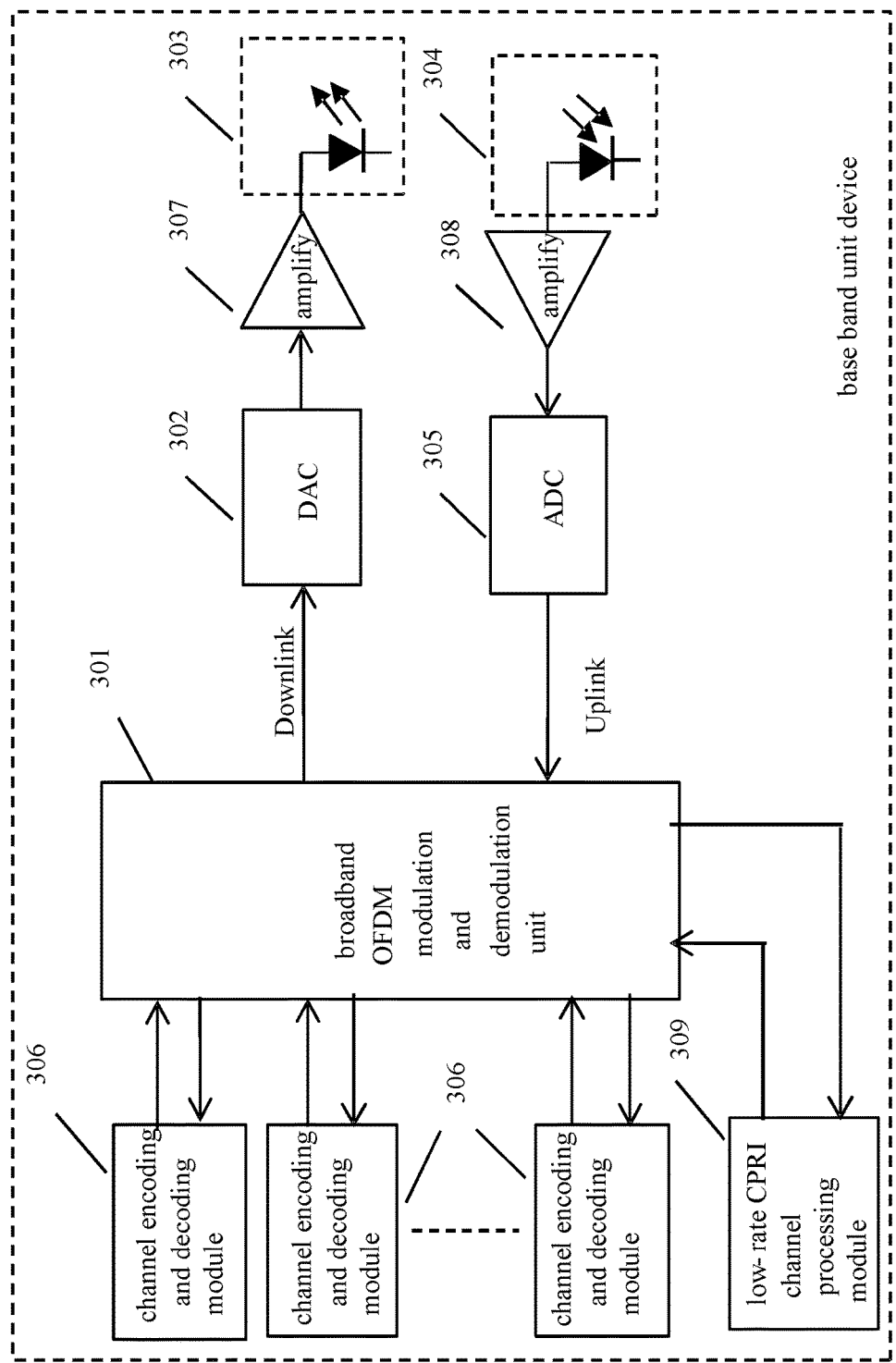
FIG. 7 is a structure diagram of another base band unit device provided by an embodiment of the present disclosure.

Optionally, as shown in FIG. 7, the base band unit device provided by the embodiment may further include a CPRI channel processing module 309, where:

the CPRI channel processing module 305 is configured to modulate data carried on a low-rate common public radio interface (CPRI) channel after encoding the same to a first CPRI carrier, and convert the first CPRI carrier into a digital modulation mode to generate a third broadband OFDM signal, the sending module 302 sends the third broadband OFDM signal to the remote radio unit, the remote radio unit recovers the third broadband OFDM signal to the first CPRI carrier and sends the first CPRI carrier to a low-rate remote radio unit through a CPRI interface, and the low-rate remote radio unit sends the first CPRI carrier to an antenna port of the low-rate remote radio unit after performing radio frequency conversion on the same.

The CPRI channel processing module 305 is configured to recover a fourth broadband OFDM signal sent by the remote radio unit and received by the receiving module 303 to a second CPRI carrier, and send the second CPRI carrier to the low-rate CPRI channel after demodulating and decoding the same, where the remote radio unit receives the second CPRI carrier sent by the low-rate remote radio unit through the CPRI interface and converts the second CPRI carrier into the fourth broadband OFDM signal.

The low-rate remote radio unit is an existing remote radio unit, and the embodiment may be compatible with the existing remote radio unit by adding the CPRI channel processing module.

Figure 8:
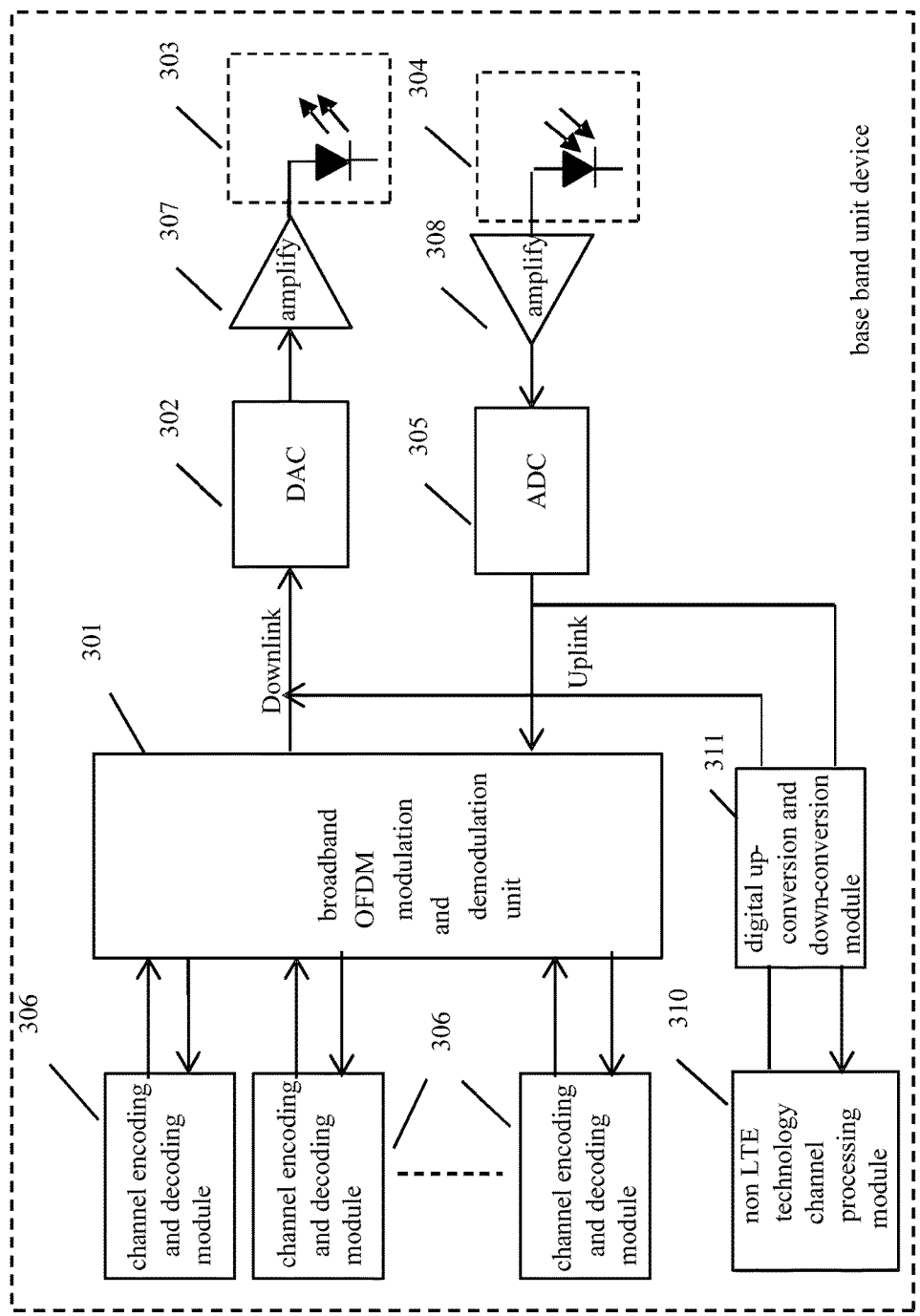
FIG. 8 is a structure diagram of another base band unit device provided by an embodiment of the present disclosure.

Optionally, as shown in FIG. 8, the base band unit device provided by the embodiment may further include a non long terms evolution LTE technology channel processing module 306 and a digital up-conversion and down-conversion module 307, where:

the non LTE technology channel processing module 306 is configured to modulate data carried on a non LTE technology channel to a first non LTE technology carrier after encoding the same;

the digital up-conversion and down-conversion module 307 is configured to send the first non LTE technology carrier to the remote radio unit through the sending module 302 after performing up-conversion on the same, and the remote radio unit sends the first non LTE technology carrier to an antenna port;

the digital up-conversion and down-conversion module 307 is configured to perform down-conversion on a second non LTE technology carrier sent by the remote radio unit and received by the receiving module 303;

the non LTE technology channel processing module 306 is configured to send the second non LTE technology carrier, performed with down-conversion by the digital up-conversion and down-conversion module 307, to the non long term evolution LTE technology channel after demodulating and decoding the same.

In the embodiment, a signal of other technologies, for example, a UMTS technology or a GSM technology, may also be transmitted in a traditional frequency shift manner using a frequency point with a certain frequency interval to achieve a multimode RRU. Since the signal of the other technologies is narrow in a bandwidth and low in a rate, a utilization rate of an optical channel is not greatly influenced.

The base band unit device provided by the embodiment combines and modulates a plurality of orthogonal LTE carriers to a broadband OFDM signal, an analog broadband OFDM signal is transmitted between the BBU and the RRU in the radio over fiber manner, since a plurality of LTE carriers are modulated to a broadband OFDM signal in a combining and modulating manner, no frequency interval needs to be reserved between the carriers, thereby a utilization rate of a link channel is improved, so that the embodiment may achieve high-capacity base station backhaul under a low cost condition. Moreover, the embodiment may be compatible with an existing RRU CPRI base station backhaul solution and may achieve a multimode and multi-technology RRU, thereby having a universality.

Figure 9:
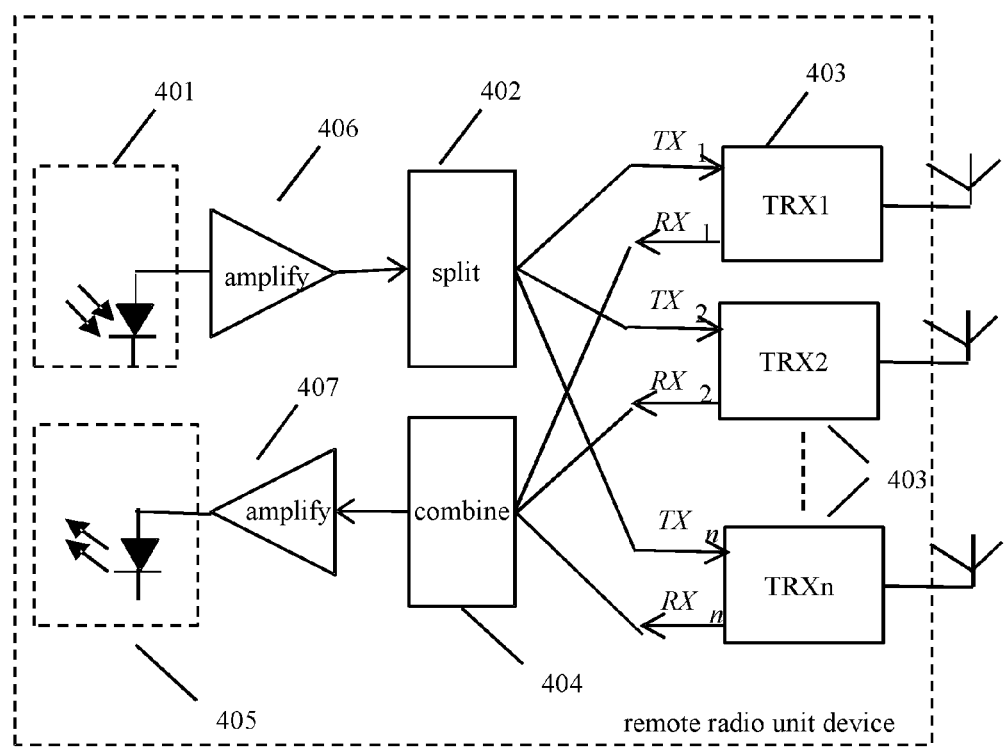
FIG. 9 is a structure diagram of a remote radio unit device provided by an embodiment of the present disclosure.

Please see FIG. 9. FIG. 9 is a structure diagram of a remote radio unit device provided by an embodiment of the present disclosure. As shown in FIG. 9, the remote radio unit device provided by the embodiment includes:

a receiving module 401, configured to receive a first analog broadband orthogonal frequency division combining (OFDM) signal sent by a base band unit in a radio over fiber manner.

A splitting module 402, configured to perform splitting processing on the first analog broadband OFDM signal received by the receiving module to generate at least two first analog broadband OFDM sub-signals.

The splitting module may be a splitter.

At least two radio frequency transceiving modules 403, configured to send the at least two first analog broadband OFDM sub-signals split by the splitting module to antenna ports corresponding to different first analog broadband OFDM sub-signals after performing filtering and frequency conversion on the at least two first analog broadband OFDM sub-signals respectively; and the at least two radio frequency transceiving modules are further configured to receive radio frequency signals through the antenna ports respectively, and perform frequency conversion and filtering on the radio frequency signals to obtain combined subcarriers corresponding to different antenna ports.

The radio frequency transceiving module may be a radio frequency transceiver.

A combining module 404, configured to perform combining processing on the combined subcarriers generated by the radio frequency transceiving modules 403 to generate a second analog broadband OFDM signal.

A sending module 405, configured to send the second analog broadband OFDM signal generated by the combining module 404 to the base band unit in the radio over fiber manner.

In order to prevent reduced transmission reliability caused by signal attenuation in a transmission process, the remote radio unit device provided by the embodiment may further include a third amplification module 406 and a fourth amplification module 407, where the third amplification module 406 amplifies the first analog broadband OFDM signal sent by the base band unit in the radio over fiber manner and received by the receiving module 401 and sends the amplified first analog broadband OFDM signal to the splitting module 402 for splitting; and the fourth amplification module 407 amplifies the second analog broadband OFDM signal before the sending module 405 sends the second analog broadband OFDM signal to the base band unit in the radio over fiber manner.

The third amplification module and the fourth amplification module may be achieved by an integrated operational amplifier.

Figure 10:
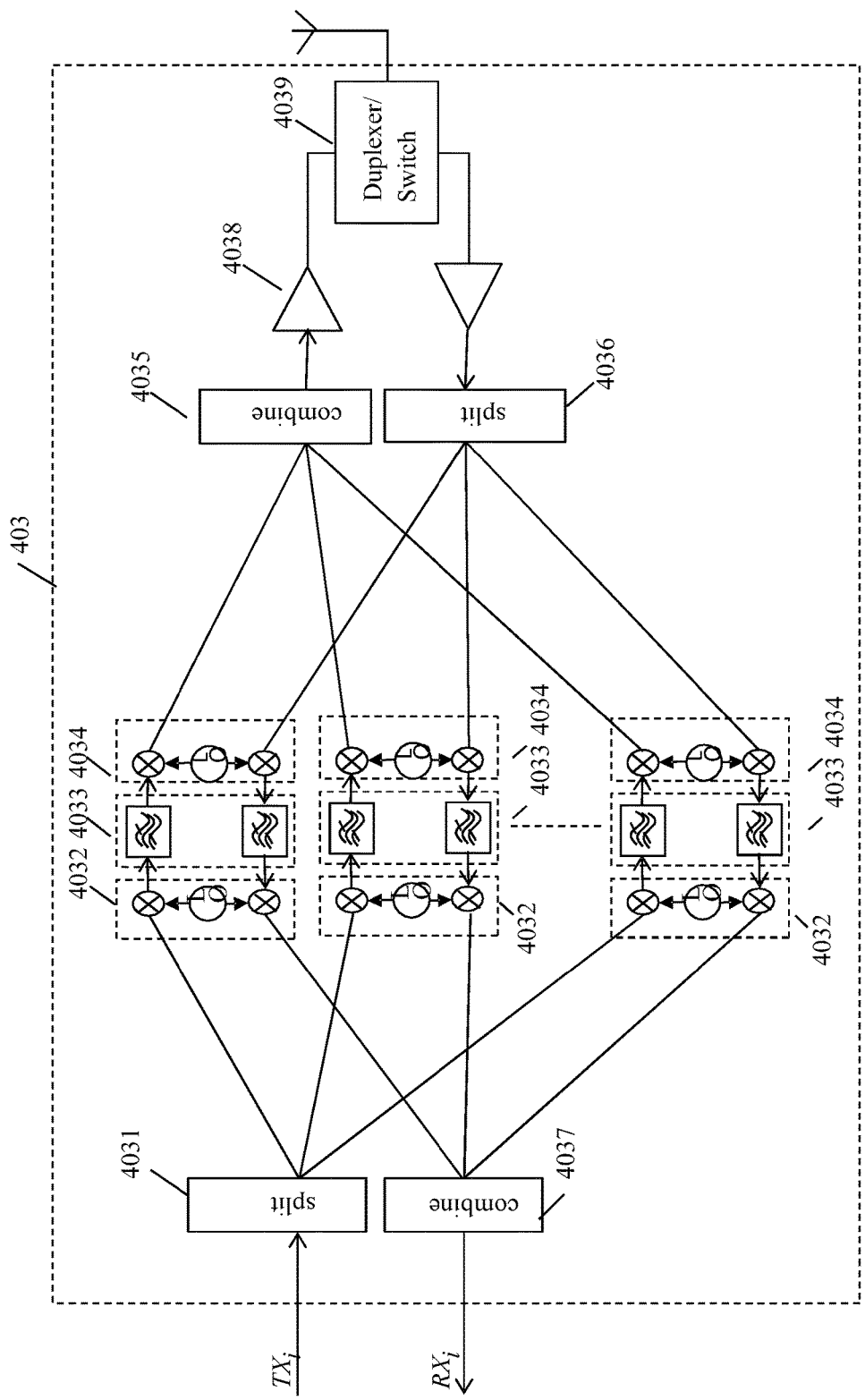
FIG. 10 is a structure diagram of a radio frequency transceiving module in the embodiment of FIG. 9.

Optionally, as shown in FIG. 10, the radio frequency transceiving module 403 includes:

a first splitting unit 4031, configured to perform splitting processing on a first analog broadband OFDM signal to generate at least two second analog broadband OFDM sub-signals;

at least two first frequency conversion units 4032, respectively configured to perform frequency shift conversion on the at least two second analog broadband OFDM sub-signals generated by the first splitting unit 4031 to generate first mixing signals.

After performing frequency shift on a second analog broadband OFDM sub-signal, the first frequency conversion unit 4032 adjusts a local frequency to adjust a central frequency of the second analog broadband OFDM sub-signal to a central frequency of a band-pass filter, to generate a first mixing signal.

At least two band-pass filtering units 4033 are respectively configured to perform band-pass filtering on the first mixing signals generated by the at least two first frequency conversion units to generate sending subcarriers.

The band-pass filtering unit may be an adjustable band-pass filter with a fixed central frequency and a bandwidth capable of being switched and selected among several values of 1.4 MHz, 3 MHz, 5 MHz, 10 MHz, 15 MHz and 20 MHz.

The band-pass filter may enable a carrier to be sent to arrive at a second frequency conversion unit and filter other carriers.

At least two second frequency conversion units 4034 are respectively configured to up convert a frequency of the sending subcarriers generated by the at least two band-pass filtering units 4033 to a transmitting frequency.

A first combining unit 4035 is configured to perform combining processing on the sending subcarriers after up-conversion of the at least two second frequency conversion units 4034, and respectively send the sending subcarriers to an antenna port corresponding to the sending subcarriers.

The first combining unit may send a signal output by a combining processing unit 4035 to a corresponding antenna port through a duplex switch 4039 after an amplifier 4038 amplifying the same.

Optionally, as shown in FIG. 10, the radio frequency transceiving module 403 further includes:

a second splitting unit 4036, configured to perform splitting processing on a radio frequency signal to generate at least two radio frequency sub-signals, and respectively send the at least two radio frequency sub-signals to corresponding second frequency conversion units, the second frequency conversion units 4034 send the radio frequency sub-signals to the band-pass filtering units corresponding to the radio frequency sub-signals after performing down-conversion on the same, the band-pass filtering units 4033 perform band-pass filtering on the radio frequency sub-signals after the down-conversion to generate receiving subcarriers and send the receiving subcarriers to the first frequency conversion units corresponding to the receiving subcarriers, and the first frequency conversion units 4032 perform frequency shift conversion on the receiving subcarriers; and a second combining unit 4037, configured to perform combining processing on the receiving subcarriers after the frequency shift conversion of the at least two first frequency conversion units to generate a combined subcarrier.

Figure 11:
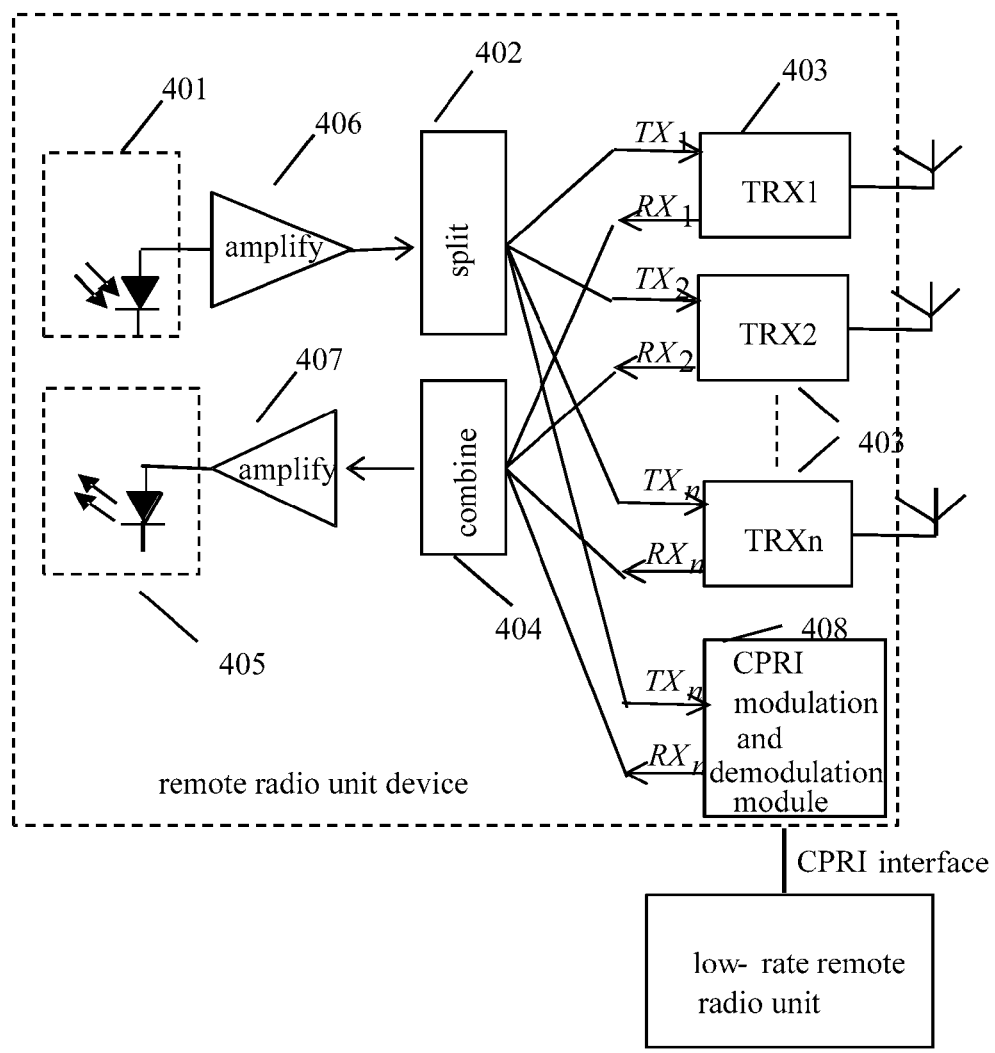
FIG. 11 is a structure diagram of another remote radio unit device provided by an embodiment of the present disclosure.

Optionally, as shown in FIG. 11, the remote radio unit device provided by the embodiment may further include:

a CPRI modulation and demodulation module 408, configured to recover a third broadband OFDM signal received by the receiving module 401 to a first common public radio interface (CPRI) carrier and send the first common public radio interface (CPRI) carrier to a low-rate remote radio unit through a CPRI interface, and the low-rate remote radio unit sends the first CPRI carrier to an antenna port of the low-rate remote radio unit after performing radio frequency conversion on the same, where the third broadband OFDM signal is sent by the base band unit after encoding and modulating data carried on a low-rate CPRI channel to obtain the first CPRI carrier, and converting the first CPRI carrier into a digital modulation manner to generate the third broadband OFDM signal; and the CPRI modulation and demodulation module 408 is configured to receive a second CPRI carrier sent by the low-rate remote radio unit through the CPRI interface, convert the second CPRI carrier into a fourth broadband OFDM signal, and send the fourth broadband OFDM signal to the base band unit, and the base band unit recovers the fourth broadband OFDM signal to the second CPRI carrier, and sends the second CPRI carrier to the low-rate CPRI channel after demodulating and decoding the same.

The low-rate remote radio unit is an existing RRU, and the embodiment may be compatible with an existing tower RRU, so that the BBU and the RRU in the present disclosure achieve an existing low-rate CPRI channel using a certain bandwidth. Meanwhile, an RRU module may also be controlled by a part of digital channels of a modulation and demodulation module.

Figure 12:
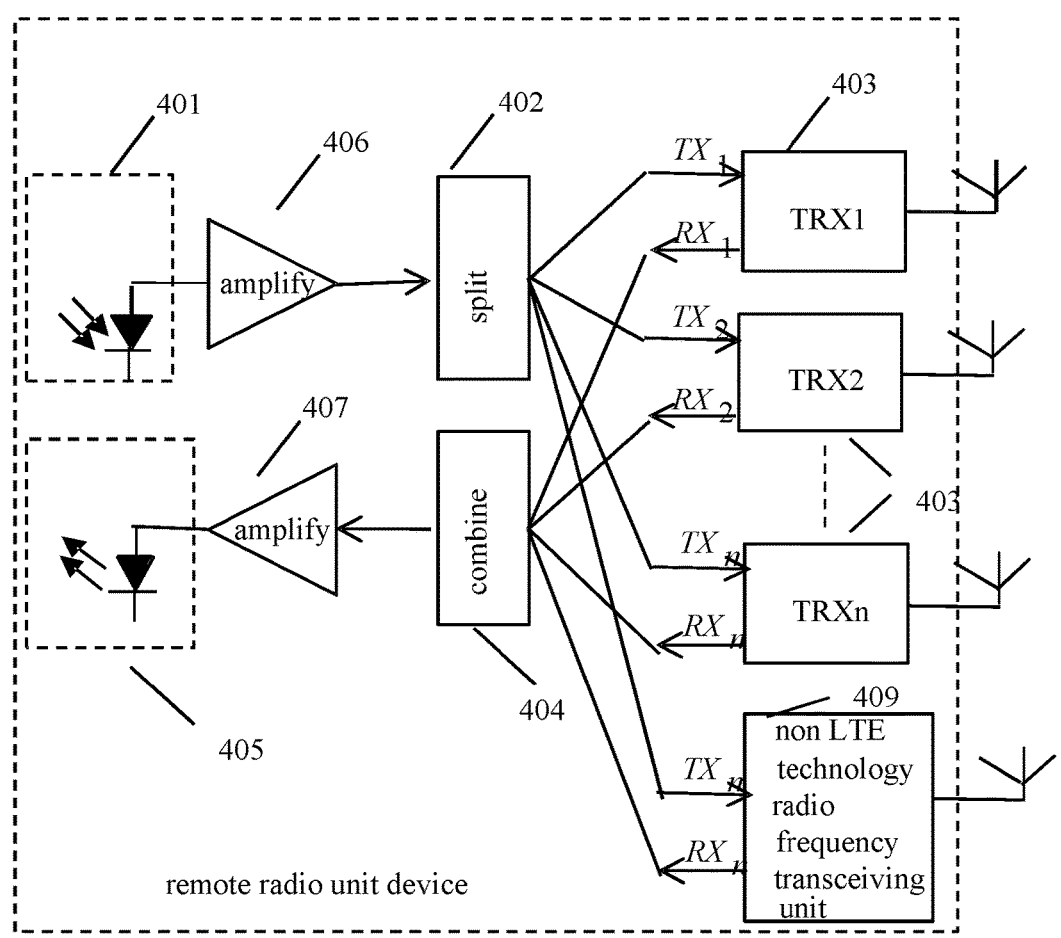
FIG. 12 is a structure diagram of another remote radio unit device provided by an embodiment of the present disclosure.

Optionally, as shown in FIG. 12, the remote radio unit device provided by the embodiment may further include:

a non LTE technology radio frequency transceiving unit 409, configured to receive a first non LTE technology carrier sent by the base band unit, and send the first non LTE technology carrier to an antenna port, where the first non LTE technology carrier is sent by the base band unit, after encoding and modulating data carried on a non LTE technology channel to the first non LTE technology carrier and performing up-conversion on the first non LTE technology carrier; and the non LTE technology radio frequency transceiving unit 409 is configured to receive a second non LTE technology carrier sent by an antenna, and send the second non LTE technology carrier to the base band unit.

The non LTE technology may be a UMTS technology or a GSM technology.

An analog broadband OFDM signal is transmitted between the remote radio unit device provided by the embodiment and the base band unit device in the radio over fiber manner, a plurality of LTE carriers are modulated to a broadband OFDM signal in a combining and modulating manner, no frequency interval needs to be reserved between the carriers, thereby a utilization rate of a link channel is improved, so that the embodiment may achieve high-capacity base station backhaul under a low cost condition. Moreover, the embodiment may be compatible with an existing RRU CPRI base station backhaul solution and may achieve a multimode and multi-technology RRU, thereby having a universality.

Base station backhaul between the remote radio unit provided by the embodiment and the BBU is transmitted through the broadband OFDM signal, the utilization rate of the link channel is high, and moreover, the embodiment may be compatible with the existing RRU CPRI base station backhaul solution and may achieve the multimode and multi-technology RRU, thereby having the universality.

Figure 13:
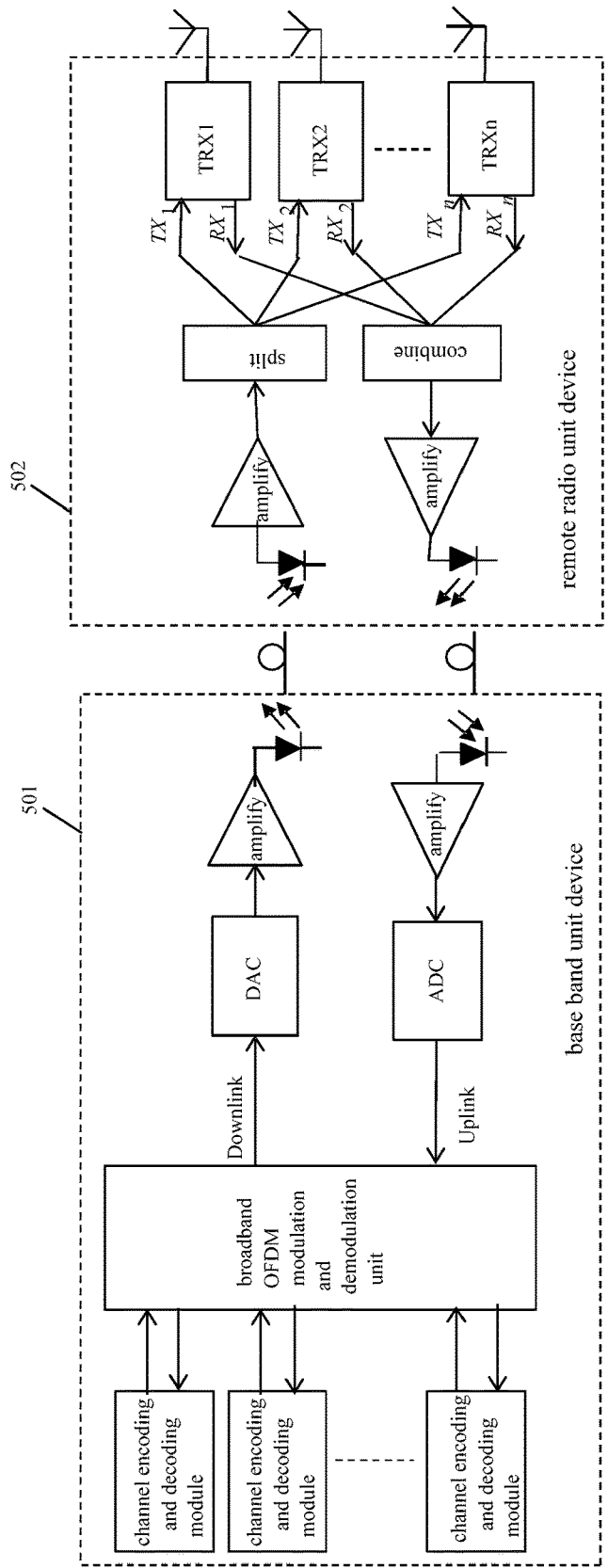
FIG. 13 is a structure diagram of a system for base station backhaul provided by an embodiment of the present disclosure.
Figure 14:
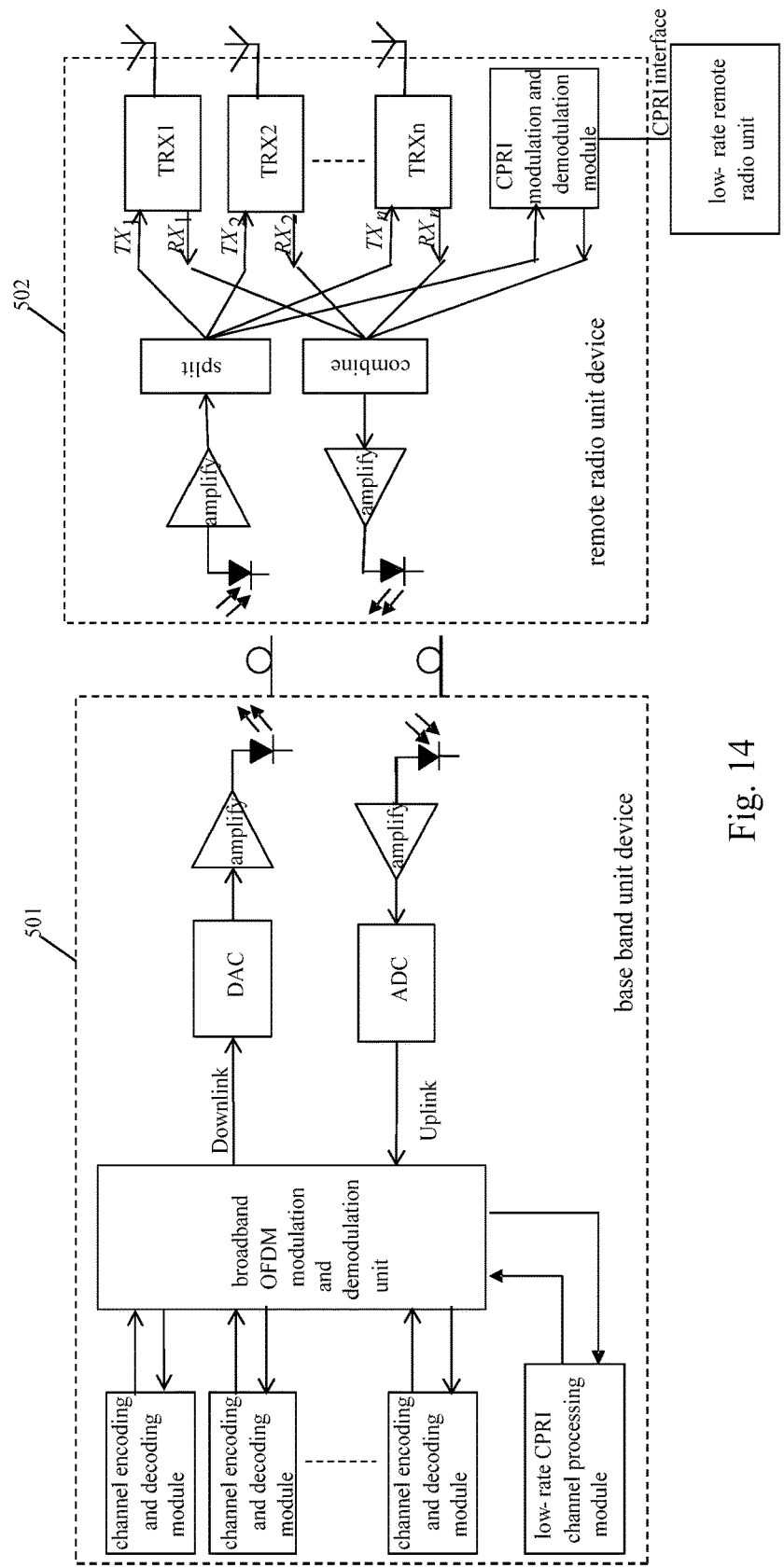
FIG. 14 is a structure diagram of another system for base station backhaul provided by an embodiment of the present disclosure.
Figure 15:
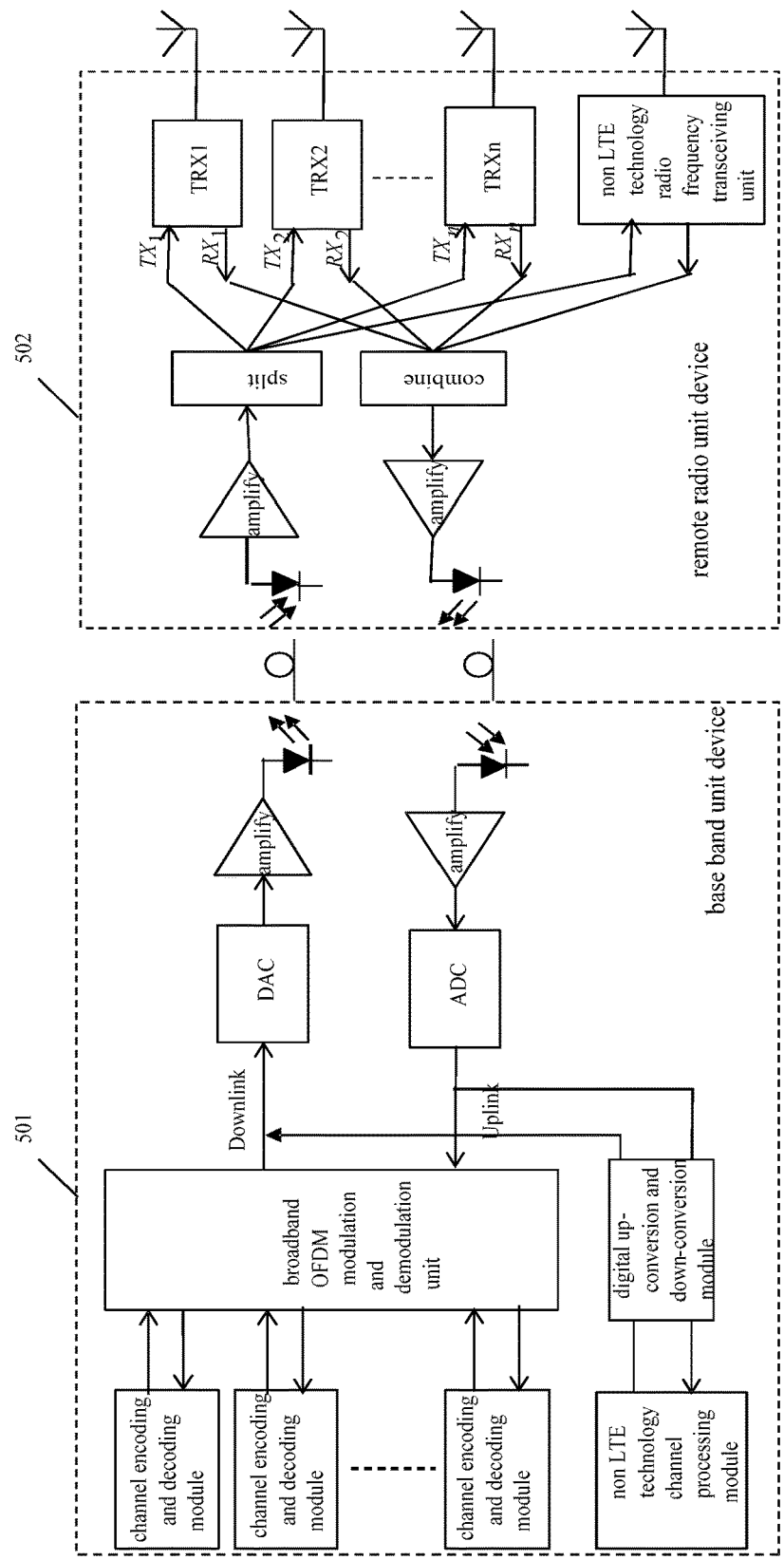
FIG. 15 is a structure diagram of another system for base station backhaul provided by an embodiment of the present disclosure.

Please see FIG. 13 to FIG. 15. FIG. 13 to FIG. 15 are structure diagrams of a system for base station backhaul provided by an embodiment of the present disclosure. The system for base station backhaul includes a base band unit device 501 and a remote radio unit device 502. For a structure and functions of the base band unit device 501, please refer to the embodiment as shown in FIG. 1 and the embodiments as shown in FIG. 4 to FIG. 8, and they will not be repeated redundantly herein; and for a structure and functions of the remote radio unit device 502, please refer to the embodiment as shown in FIG. 3 and the embodiments as shown in FIG. 9 to FIG. 12, and they will not be repeated redundantly herein.

The base band unit device 501 and the remote radio unit device 502 may transmit a signal through a linear optimal module.

The base band unit device of the embodiment combines and modulates a plurality of orthogonal LTE carriers to a broadband OFDM signal, no frequency interval needs to be reserved between the carriers, base station backhaul between the remote radio unit and the remote radio unit device is transmitted through the broadband OFDM signal, thereby a utilization rate of a link channel is improved, and thus the present disclosure may achieve high-capacity base station backhaul under a low cost condition.

The system for base station backhaul provided by the embodiment is a distributed base station system, on a downlink, the base band unit device combines and modulates a plurality of orthogonal LTE carriers to a broadband OFDM signal, converts the broadband OFDM signal into an analog broadband OFDM signal and sends the analog broadband OFDM signal to the remote radio unit device through ROF, the remote radio unit device converts the analog broadband OFDM signal into a radio frequency signal and transmits the radio frequency signal through an antenna; on an uplink, the remote radio unit device converts a radio frequency signal received through the antenna into an analog broadband OFDM signal and sends the analog broadband OFDM signal to the base band unit device through ROF. Base station backhaul between the base band unit device and the remote radio unit device is transmitted by an OFDM signal, no frequency interval needs to be reserved between carriers, thereby a utilization rate of an optical transmission channel is improved, and the present disclosure may achieve high-capacity base station backhaul under a low cost condition.

Those of ordinary skill in the art may understand that all or a part of the flows in the above-mentioned method embodiments may be implemented with a computer program instructing corresponding hardware, the program may be stored in a computer readable storage medium, and when being executed, the program may include the flows of the embodiments of the above-mentioned methods. The storage medium may be a magnetic disk, an optical disk, a read-only memory (ROM), a random access memory (RAM) or the like.

The foregoing descriptions are merely preferred embodiments of the present disclosure, rather than limiting the protection scope of the present disclosure. Therefore, equivalent variations made according to the claims of the present disclosure are still encompassed in the scope of the present disclosure.

What is claimed is:

1. A method for base station backhaul, comprising:
    modulating data carried on at least two channels to corresponding sending carriers respectively, combining and modulating the sending carriers to a first broadband orthogonal frequency division combining (OFDM) signal, performing digital-analog conversion on the first broadband OFDM signal to generate a first analog broadband OFDM signal, and sending the first analog broadband OFDM signal to a remote radio unit in a radio over fiber manner; and
    receiving a second analog broadband OFDM signal sent by the remote radio unit in the radio over fiber manner, performing analog-digital conversion on the second analog broadband OFDM signal to generate a second broadband OFDM signal, demodulating receiving carriers comprised in the second broadband OFDM signal, and sending data obtained by demodulating to channels corresponding to different receiving carriers respectively;
    wherein the method further comprises:
    modulating data carried on a low-rate common public radio interface (CPRI) channel after encoding the data to a first CPRI carrier, converting the first CPRI carrier into a digital modulation mode to generate a third broadband OFDM signal, sending the third broadband OFDM signal to the remote radio unit, recovering, by the remote radio unit, the third broadband OFDM signal to the first CPRI carrier and sending, by the remote radio unit, the first CPRI carrier to a low-rate remote radio unit through a CPRI interface, and sending, by the low-rate remote radio unit, the first CPRI carrier to an antenna port of the low-rate remote radio unit after performing radio frequency conversion on the first CPRI carrier; and
    receiving a fourth broadband OFDM signal sent by the remote radio unit, recovering the fourth broadband OFDM signal to a second CPRI carrier, and sending the second CPRI carrier to the low-rate CPRI channel after demodulating and decoding the second CPRI carrier, wherein the remote radio unit receives the second CPRI carrier sent by the low-rate remote radio unit through the CPRI interface and converts the second CPRI carrier into the fourth broadband OFDM signal.

2. The method according to claim 1, wherein the method further comprises:
    before the modulating the data carried on the at least two channels to the corresponding sending carriers respectively, encoding the data carried on the at least two channels respectively; and
    after the sending the data obtained by the demodulating to the channels corresponding to the different receiving carriers respectively, decoding the data respectively.

3. A method for base station backhaul, comprising:
    modulating data carried on at least two channels to corresponding sending carriers respectively, combining and modulating the sending carriers to a first broadband orthogonal frequency division combining (OFDM) signal, performing digital-analog conversion on the first broadband OFDM signal to generate a first analog broadband OFDM signal, and sending the first analog broadband OFDM signal to a remote radio unit in a radio over fiber manner; and
    receiving a second analog broadband OFDM signal sent by the remote radio unit in the radio over fiber manner, performing analog-digital conversion on the second analog broadband OFDM signal to generate a second broadband OFDM signal, demodulating receiving carriers comprised in the second broadband OFDM signal, and sending data obtained by demodulating to channels corresponding to different receiving carriers respectively;
    wherein the method further comprises:
    modulating data carried on a non-long term evolution (LTE) technology channel to a first non-LTE technology carrier after encoding the data, sending the first non-LTE technology carrier to the remote radio unit after performing up-conversion on the first non-LTE technology carrier, and sending, by the remote radio unit, the first non-LTE technology carrier to an antenna port; and
    receiving a second non-LTE technology carrier sent by the remote radio unit, and sending the second non-LTE technology carrier to the non-LTE technology channel after demodulating and decoding the second non-LTE technology carrier, wherein the non-LTE technology is a universal mobile telecommunications system (UMTS) technology or a global system for mobile communications (GSM) technology.

4. A method for base station backhaul, comprising:
    receiving a first analog broadband orthogonal frequency division combining (OFDM) signal sent by a base band unit in a radio over fiber manner, performing splitting processing on the first analog broadband OFDM signal to generate at least two first analog broadband OFDM sub-signals, and sending the at least two first analog broadband OFDM sub-signals to antenna ports corresponding to different first analog broadband OFDM sub-signals after performing filtering and frequency conversion on the at least two first analog broadband OFDM sub-signals respectively; and
    receiving radio frequency signals through the antenna ports, performing frequency conversion and filtering on the radio frequency signals to obtain combined carriers corresponding to different antenna ports, performing combining processing on the combined carriers to generate a second analog broadband OFDM signal, and sending the second analog broadband OFDM signal to the base band unit in the radio over fiber manner.

5. The method according to claim 4, wherein sending a first analog broadband OFDM sub-signal to a corresponding antenna port after performing filtering and frequency conversion on the first analog broadband OFDM sub-signal, comprises:
  performing splitting processing on the first analog broadband OFDM sub-signal to generate at least two second analog broadband OFDM sub-signals;
  performing frequency shift conversion on the second analog broadband OFDM sub-signals to generate first mixing signals;
  performing band-pass filtering on the first mixing signals to generate sending carriers;
  up converting a frequency of the sending carriers to a transmitting frequency; and
  performing combining processing on the sending carriers after up-conversion, and sending the sending carriers to an antenna port corresponding to the sending carriers.

6. The method according to claim 5, wherein performing frequency conversion and filtering on a radio frequency signal to obtain a corresponding combined carrier, comprises:
  performing splitting processing on the radio frequency signal to generate at least two radio frequency sub-signals;
  performing down-conversion on the radio frequency sub-signals;
  performing band-pass filtering on the radio frequency sub-signals after the down-conversion to generate receiving carriers;
  performing frequency shift conversion on the receiving carriers; and
  performing combining processing on the receiving carriers after the frequency shift conversion to generate the combined carrier.

7. The method according to claim 5, wherein the method further comprises:
  receiving a third broadband OFDM signal sent by the base band unit, recovering the third broadband OFDM signal to a first common public radio interface (CPRI) carrier and sending the first CPRI carrier to a low-rate remote radio unit through a CPRI interface, and sending, by the low-rate remote radio unit, the first CPRI carrier to an antenna port of the low-rate remote radio unit after performing radio frequency conversion on the first CPRI carrier, wherein the third broadband OFDM signal is sent by the base band unit after encoding and modulating data carried on a low-rate CPRI channel to obtain the first CPRI carrier, and converting the first CPRI carrier in a digital modulation manner to generate the third broadband OFDM signal; and
  receiving a second CPRI carrier sent by the low-rate remote radio unit through the CPRI interface, converting the second CPRI carrier into a fourth broadband OFDM signal, sending the fourth broadband OFDM signal to the base band unit, recovering, by the base band unit, the fourth broadband OFDM signal to the second CPRI carrier, and sending, by the base band unit, the second CPRI carrier to the low-rate CPRI channel after demodulating and decoding the second CPRI carrier.

8. The method according to claim 5, wherein the method further comprises:
  receiving a first non-long term evolution (LTE) technology carrier sent by the base band unit, and sending the first non-LTE technology carrier to an antenna port, wherein the first non-LTE technology carrier is sent by the base band unit after encoding and modulating data carried on a non-LTE technology channel to the first non-LTE technology carrier and performing up-conversion on the first non-LTE technology carrier; and
  receiving a second non-LTE technology carrier sent by an antenna, and sending the second non-LTE technology carrier to the base band unit, wherein the non-LTE technology is a universal mobile telecommunications system (UMTS) technology or a global system for mobile communications (GSM) technology.

9. A base band unit device, comprising:
  a processor, configured to modulate data carried on at least two channels to corresponding sending carriers respectively, combine and modulate the sending carriers to a first broadband OFDM signal, perform digital-analog conversion on the first broadband OFDM signal to generate a first analog broadband OFDM signal;
  a transmitter, configured to send the first analog broadband OFDM signal to a remote radio unit in a radio over fiber manner; and
  a receiver, configured to receive a second broadband OFDM signal sent by the remote radio unit in the radio over fiber manner;
  wherein the processor is further configured to perform analog-digital conversion on the second analog broadband OFDM signal to generate a second broadband OFDM signal, demodulate receiving carriers comprised in the second broadband OFDM signal, and send data obtained by demodulating to channels corresponding to different receiving carriers respectively;
  wherein the processor is further configured to modulate data carried on a low-rate common public radio interface (CPRI) channel after encoding the data to a first CPRI carrier, and convert the first CPRI carrier into a digital modulation mode to generate a third broadband OFDM signal, the transmitter is further configured to send the third broadband OFDM signal to the remote radio unit, the remote radio unit recovers the third broadband OFDM signal to the first CPRI carrier and sends the first CPRI carrier to a low-rate remote radio unit through a CPRI interface, and the low-rate remote radio unit sends the first CPRI carrier to an antenna port of the low-rate remote radio unit after performing radio frequency conversion on the first CPRI carrier; and
  the processor is further configured to recover a fourth broadband OFDM signal sent by the remote radio unit and received by the receiver to a second CPRI carrier, and send the second CPRI carrier to the low-rate CPRI channel after demodulating and decoding the second CPRI carrier, wherein the remote radio unit receives the second CPRI carrier sent by the low-rate remote radio unit through the CPRI interface and converts the second CPRI carrier into the fourth broadband OFDM signal.

10. The device according to claim 9, wherein the processor is further configured to encode the data carried on the at least two channels respectively, and decode the data obtained by the demodulating respectively.

11. A base band unit device, comprising:
  a processor, configured to modulate data carried on at least two channels to corresponding sending carriers respectively, combine and modulate the sending carriers to a first broadband OFDM signal, perform digital-analog conversion on the first broadband OFDM signal to generate a first analog broadband OFDM signal;

a transmitter, configured to send the first analog broadband OFDM signal to a remote radio unit in a radio over fiber manner; and a receiver, configured to receive a second broadband OFDM signal sent by the remote radio unit in the radio over fiber manner;

wherein the processor is further configured to perform analog-digital conversion on the second analog broadband OFDM signal to generate a second broadband OFDM signal, demodulate receiving carriers comprised in the second broadband OFDM signal, and send data obtained by demodulating to channels corresponding to different receiving carriers respectively;

wherein the processor is further configured to modulate data carried on a non-long term evolution (LTE) technology channel to a first non-LTE technology carrier after encoding the data, send the first non-LTE technology carrier to the remote radio unit through the transmitter after performing up-conversion on the first non-LTE technology carrier, and the remote radio unit sends the first non-LTE technology carrier to an antenna port;

the processor is further configured to perform down-conversion on a second non-LTE technology carrier sent by the remote radio unit and received by the receiver; and send the second non-LTE technology carrier, performed with down-conversion, to the non-LTE technology channel after demodulating and decoding the second non-LTE technology carrier, wherein the non-LTE technology is a universal mobile telecommunications system (UMTS) technology or a global system for mobile communications (GSM) technology.

12. A remote radio unit device, comprising:

a receiver, configured to receive a first analog broadband orthogonal frequency division combining (OFDM) signal sent by a base band unit in a radio over fiber manner;

a processor, configured to perform splitting processing on the first analog broadband OFDM signal to generate at least two first analog broadband OFDM sub-signals, send the at least two first analog broadband OFDM sub-signals to antenna ports corresponding to different first analog broadband OFDM sub-signals after performing filtering and frequency conversion on the at least two first analog broadband OFDM sub-signals respectively, receive radio frequency signals through the antenna ports respectively, perform frequency conversion and filtering on the radio frequency signals to obtain combined carriers corresponding to different antenna ports, and perform combining processing on the combined carriers to generate a second analog broadband OFDM signal; and a transmitter, configured to send the second analog broadband OFDM signal generated by the combining module to the base band unit in the radio over fiber manner.

13. The device according to claim 12, wherein the processor is further configured to perform splitting processing on a first analog broadband OFDM sub-signal to generate at least two second analog broadband OFDM sub-signals, perform frequency shift conversion on the at least two second analog broadband OFDM sub-signals to generate first mixing signals, perform band-pass filtering on the first mixing signals to generate sending carriers, up convert a frequency of the sending carriers to a transmitting frequency, perform combining processing on the sending carriers after up-conversion, and respectively send the sending carriers to an antenna port corresponding to the sending carriers.

14. The device according to claim 13, wherein the processor is further configured to perform splitting processing on a radio frequency signal to generate at least two radio frequency sub-signals, perform down-conversion on the radio frequency sub-signals, perform band-pass filtering on the radio frequency sub-signals after the down-conversion to generate receiving carriers, perform frequency shift conversion on the receiving carriers, and perform combining processing on the receiving carriers after the frequency shift conversion to generate a combined carrier.

15. The device according to claim 12, wherein the processor is further configured to recover a third broadband OFDM signal received by the receiver to a first common public radio interface (CPRI) carrier and send the first CPRI carrier to a low-rate remote radio unit through a CPRI interface, and wherein the low-rate remote radio unit sends the first CPRI carrier to an antenna port of the low-rate remote radio unit after performing radio frequency conversion on the first CPRI carrier, wherein the third broadband OFDM signal is sent by the base band unit after encoding and modulating data carried on a low-rate CPRI channel to obtain the first CPRI carrier, and converting the first CPRI carrier into a digital modulation manner to generate the third broadband OFDM signal; and the processor is further configured to receive a second CPRI carrier sent by the low-rate remote radio unit through the CPRI interface, convert the second CPRI carrier into a fourth broadband OFDM signal, and the transmitter is further configured to send the fourth broadband OFDM signal to the base band unit, and the base band unit recovers the fourth broadband OFDM signal to the second CPRI carrier, and sends the second CPRI carrier to the low-rate CPRI channel after demodulating and decoding the second CPRI carrier.

16. The device according to claim 12, wherein the receiver is further configured to receive a first non-long term evolution (LTE) technology carrier sent by the base band unit, and the processor is further configured to send the first non-LTE technology carrier to an antenna port, wherein the first non-LTE technology carrier is sent by the base band unit after encoding and modulating data carried on a non-LTE technology channel to the first non-LTE technology carrier and performing up-conversion on the first non-LTE technology carrier; and the processor is further configured to receive a second non-LTE technology carrier sent by an antenna, and the transmitter is further configured to send the second non-LTE technology carrier to the base band unit, wherein the non-LTE technology is a universal mobile telecommunications system (UMTS) technology or a global system for mobile communications (GSM) technology.

* * * * *